(12) United States Patent
Hunt

(10) Patent No.: US 6,988,627 B2
(45) Date of Patent: Jan. 24, 2006

(54) STORAGE TRAY DEVICES AND METHODS OF STORING AND ACCESSING ITEMS

(75) Inventor: Thomas Hunt, Rancho Santa Fe, CA (US)

(73) Assignee: Spectrum Concepts, Inc., Carlsbad, CA (US)

( * ) Notice: Subject to any disclaimer, the term of this patent is extended or adjusted under 35 U.S.C. 154(b) by 0 days.

(21) Appl. No.: 10/121,979

(22) Filed: Apr. 12, 2002

(65) Prior Publication Data

US 2003/0192837 A1   Oct. 16, 2003

(51) Int. Cl.
  *A47G 29/00* (2006.01)
(52) U.S. Cl. ............... 211/40; 211/41.12; 211/184
(58) Field of Classification Search ............ 211/41.12, 211/40, 41.1, 50, 42, 43, 184, 24, 19, 20, 211/85.4, 49.1, 41.2, 41.3–41.4; 312/9.1, 312/9.9, 9.11, 9.16, 9.17, 9.32, 9.31, 50, 128; 206/307.1, 387.12, 387.15, 308.1; D6/407, D6/629
See application file for complete search history.

(56) References Cited

U.S. PATENT DOCUMENTS

| | | | | |
|---|---|---|---|---|
| 1,237,010 A | * | 8/1917 | Adams | 211/40 |
| 1,402,332 A | * | 1/1922 | Wiehl | 211/40 |
| 1,453,065 A | * | 4/1923 | Fargo | 29/237.5 |
| 2,238,451 A | * | 4/1941 | Roth | 211/40 |
| 2,261,806 A | * | 11/1941 | Hills | 312/9.43 |
| D153,115 S | * | 3/1949 | Childs | D27/125 |
| 2,499,221 A | * | 2/1950 | Hinsdale | 211/40 |
| 2,686,675 A | * | 8/1954 | Shedd | 273/149 R |
| 2,813,633 A | * | 11/1957 | Welling | 211/41.12 |
| 3,185,307 A | * | 5/1965 | Higgins | 211/40 |
| 3,338,421 A | * | 8/1967 | Lyman | 211/41.12 |
| 3,339,748 A | * | 9/1967 | Boesch | 211/81 |
| 3,391,792 A | * | 7/1968 | Makar | 211/40 |
| D217,633 S | * | 5/1970 | Iorio | D32/55 |
| 3,613,895 A | * | 10/1971 | Larkin | 211/40 |
| 3,635,350 A | * | 1/1972 | Wolf | 211/40 |
| 3,812,975 A | * | 5/1974 | Gutierrez | 211/40 |
| 3,969,007 A | * | 7/1976 | Lowry | 312/9.21 |
| 3,977,523 A | * | 8/1976 | Cousino | 206/387.15 |
| 4,087,138 A | * | 5/1978 | McRae | 312/9.22 |
| 4,239,109 A | * | 12/1980 | Nielsen et al. | 206/387.15 |
| 4,257,524 A | * | 3/1981 | Yonkers et al. | 211/71.01 |
| 4,317,603 A | * | 3/1982 | Pepicelli et al. | 312/9.47 |
| 4,330,162 A | * | 5/1982 | Aboussouan | 312/9.21 |
| 4,611,720 A | * | 9/1986 | Staab | 211/60.1 |
| 4,651,882 A | * | 3/1987 | Wright et al. | 211/40 |
| 4,668,027 A | * | 5/1987 | King et al. | 312/9.24 |
| 4,684,027 A | * | 8/1987 | Wright | 211/40 |
| 4,723,662 A | * | 2/1988 | Johnson | 211/40 |
| 4,969,561 A | * | 11/1990 | Yang | 211/59.2 |

(Continued)

*Primary Examiner*—Jennifer E. Novosad
(74) *Attorney, Agent, or Firm*—Duckor Spradling Metzger & Wynne; Bernard L. Kleinke

(57) ABSTRACT

Storage devices and methods for storing and accessing items that are adapted to support an item in at least two positions, a stored position and an ejected position. In the stored position, an item may be aligned with adjacent items to allow a user to view a perimeter edge of each item. A latch support secures the item in the stored position, and permits the unlatching of the item to permit it to rotate under force of gravity to a stable ejected position. In the ejected position, a portion of the desired item protrudes the alignment, allowing a user to easily grasp and remove the desired item without disturbing adjacent items.

33 Claims, 28 Drawing Sheets

U.S. PATENT DOCUMENTS

| | | | | |
|---|---|---|---|---|
| 4,971,206 A | * | 11/1990 | Lemmerman et al. | 211/41.12 |
| 5,000,526 A | * | 3/1991 | Comerford | 312/9.58 |
| 5,042,672 A | * | 8/1991 | Mehlin et al. | 211/42 |
| 5,170,893 A | * | 12/1992 | Smith | 211/40 |
| 5,178,284 A | * | 1/1993 | Wojewoda | 211/40 |
| 5,191,983 A | * | 3/1993 | Hardy | 211/40 |
| 5,269,447 A | * | 12/1993 | Gower et al. | 224/542 |
| 5,292,010 A | * | 3/1994 | Pickles et al. | 211/41.12 |
| 5,314,077 A | * | 5/1994 | Theosabrata | 211/40 |
| 5,415,298 A | * | 5/1995 | Callahan et al. | 211/40 |
| 5,439,119 A | * | 8/1995 | Chow | 211/49.1 |
| 5,558,235 A | * | 9/1996 | Hunt | 211/40 |
| RE35,761 E | * | 4/1998 | Dardashti | 211/40 |
| 5,934,463 A | * | 8/1999 | Yu | 211/40 |
| 6,082,553 A | * | 7/2000 | Stravitz | 211/40 |
| 6,116,432 A | * | 9/2000 | Rohner | 211/40 |
| 6,126,020 A | * | 10/2000 | Mok | 211/40 |
| 6,238,022 B1 | * | 5/2001 | Chan | 312/9.11 |
| 6,279,757 B1 | * | 8/2001 | Hayoun | 211/40 |
| 6,332,546 B1 | * | 12/2001 | Hunt | 211/40 |
| 2003/0019825 A1 | * | 1/2003 | de Rouvray | |

* cited by examiner

STORAGE TRAY DEVICES AND METHODS OF STORING AND ACCESSING ITEMS

BACKGROUND OF THE INVENTION

1. Field of the Invention

The invention relates to method and system for storing items. In particular, the invention relates to storage trays adapted to render items readily accessible.

2. Related Art

There have been many different storage units and organizers for various different types and kinds of multimedia packages for compact disks, videocassettes, computer floppy disks, and many others. For example, reference may be made to the following U.S. Pat. Nos. 2,499,221; 3,339,748; 3,391,792; 3,812,975; 3,969,007; 4,087,138; 4,330,162; 4,668,027; 4,651,882; 4,969,561; 4,971,206; 5,042,672; 5,191,983; 5,292,010; and 5,439,119.

Such organizers and storage devices typically would only store one type of such multimedia package, such as a compact disk package. One successful device for storing different kinds of multimedia packages at the same time is disclosed in U.S. Pat. No. 5,558,235, which is incorporated herein by reference. The patented device stores a series of different types and kinds of multimedia packages in a closely spaced upright stack configuration in a side-by-side manner by utilizing individual compartments. Each one of the packages can be flipped between forwardly and rearwardly inclined positions to inspect the different packages and for aiding in the selection of a given one of them.

Other organizers allow the packages to be stored in a side-by-side manner with only the thin perimeter edge of each package accessible to the user. Since most packages have an identifier on the thin perimeter edge, such a configuration allows a user to view identifiers of many packages without disturbing their respective positions. This configuration, however, has the disadvantage that removal of a single package is difficult since the user must manipulate the package via the thin perimeter edge.

It is desirable, therefore, to provide a storage tray that allows simple manipulation of each stored item while allowing a user to view many items.

BRIEF DESCRIPTION OF THE DRAWINGS

In the following, the invention will be explained in further detail with reference to the drawings, in which.

DESCRIPTION OF CERTAIN EMBODIMENTS OF THE INVENTION

The present invention provides a system and a method for storage of items such as media packages and others. The disclosed embodiments of the invention enables the easy removal of a desired one item from a plurality of closely spaced stored items. The disclosed embodiments are adapted to support an item such as a multimedia package in at least two positions, a stored position and an ejected position. In the stored position, an item may be aligned with adjacent items to allow a user to view a perimeter edge of each item. A latch support secures the item in the stored position, and allows the unlatching of the item to permit it to rotate and /or translate under force of gravity to a stable ejected position. In the ejected position, a portion of the desired item protrudes from the alignment, allowing a user to easily grasp and remove the desired item without disturbing adjacent items.

Figure 1:
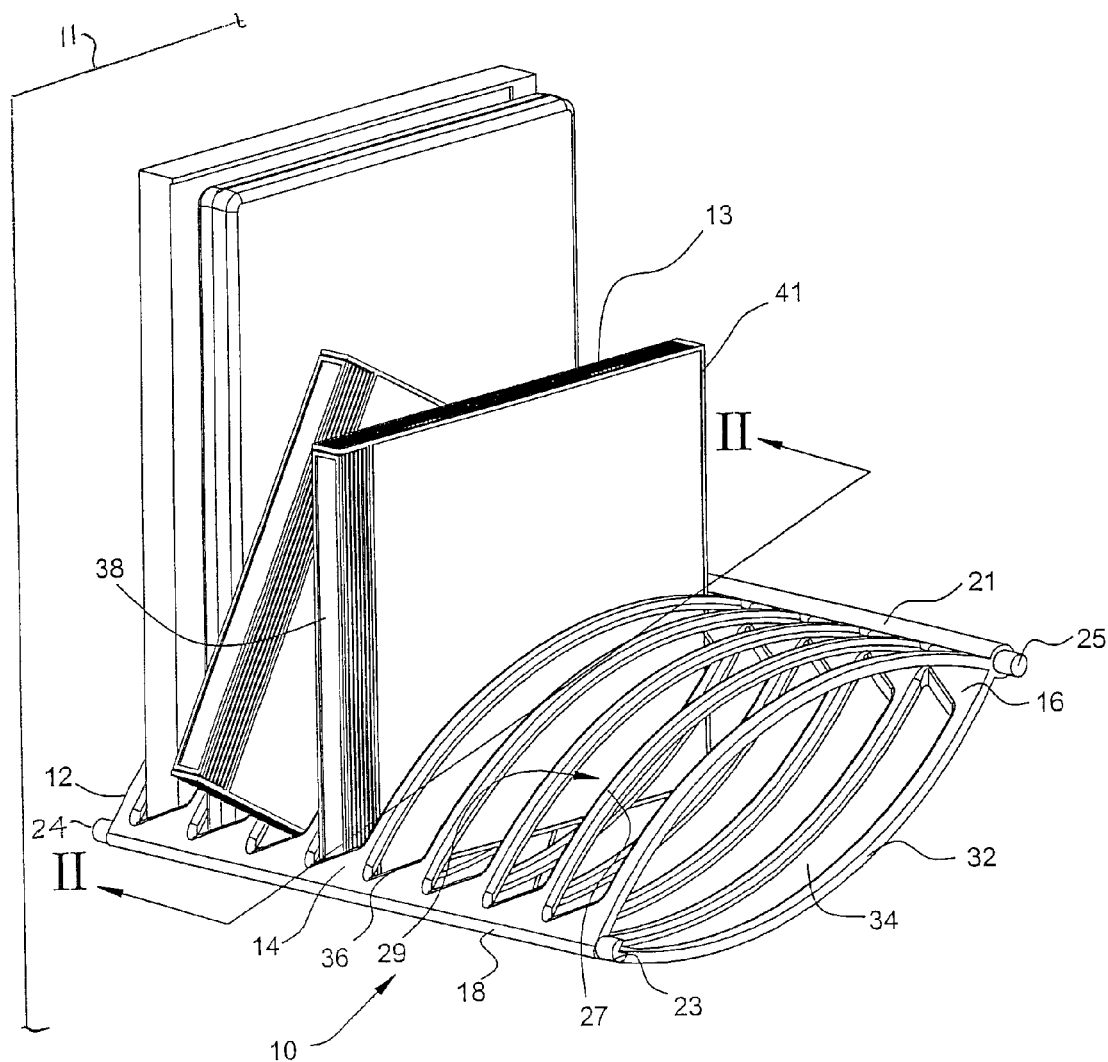
FIG. 1 is a pictorial diagram of a storage tray according to an embodiment of the invention.
Figure 2:
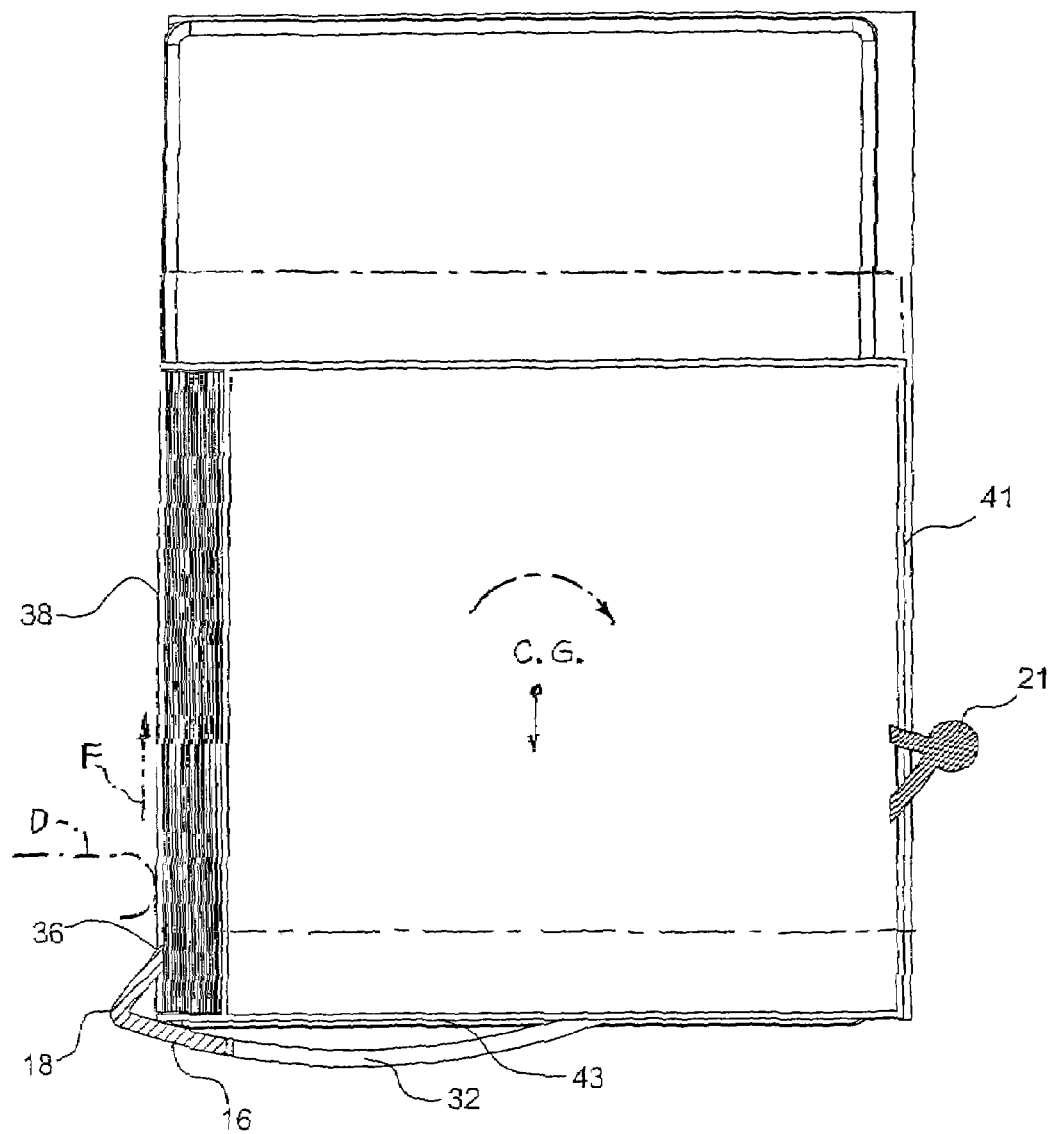
FIG. 2 is a cross-sectional side view of the storage tray of FIG. 1 with items in a stored position.
Figure 3:
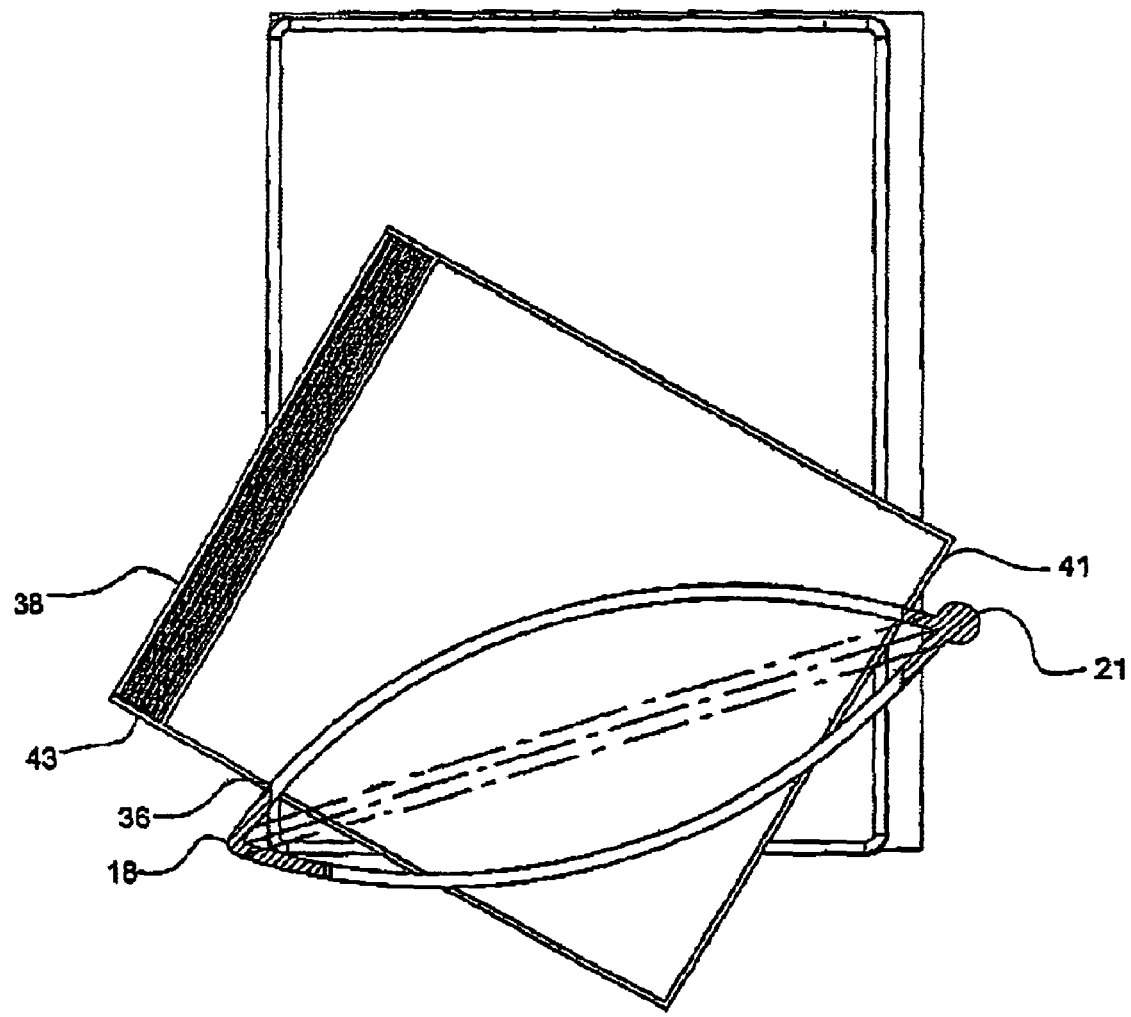
FIG. 3 is a cross-sectional side view of the storage tray of FIG. 1 with one item in an ejected position.

FIGS. 1 through 3 illustrate one embodiment of a storage tray 10 according to the present invention. The tray 10 may be supported between a pair of parallel, spaced-apart upright walls, such as a wall 11 of a furniture unit such as a desk, the opposite wall not being illustrated for sake of clarity. It is to be understood that there may be different types and kinds of supports for the tray 10.

The storage tray includes a tray body 12 adapted to store items such as a CD package 13. The tray body 12 comprises an upper arc 14 and a lower arc 16 converging at a front rail 18 and a rear rail 21. The front rail 18 and the rear rail 21 are provided with front pegs 23 and 24, and rear pegs such as rear peg 25, respectively, at each end of the tray body. The front and rear pegs may be used to secure the storage tray to, for example, the walls, such as the wall 11 of the unit of office furniture. In this regard, the pegs, such as the peg 24, is adapted to fit into an opening or hole (not shown) in the wall 11. However, it will become apparent to those skilled in the art that there may be different types and kinds of techniques for attaching the tray 10 to a support structure.

In one embodiment, the upper arc 14 and the lower arc 16 may be in a flat configuration for transportation purposes as shown in broken lines in FIG. 3. The pegs 23–25 may be used to secure the tray body 12 to a furniture piece in a deformed or stressed configuration in which the upper arc and the lower arc are deformed under pressure into the position illustrated in FIG. 1 due to the spacing of the holes (not shown) in the support structure. It should be understood that the tray of the present invention may also be configured in other ways, such, for example, as a fixed or non-deformable version of the tray 10, The upper arc 14 is provided with a plurality of top flanges 27 forming top slots or openings 29 therebetween. Similarly, the lower arc 16 is provided with a series of bottom flanges 32 forming bottom slots or openings 34. The top flanges 27 and the bottom flanges 32 are positions such that each top slot 29 has a corresponding bottom slot 34. The slots 29, 34 are sized to accommodate a variety of items. For example, the slots are large enough to hold a DVD package, as well as thinner CD packages. An angled slot edge 36 may be provided at the front end of the slots for securing thinner packages such as CD package 13 in a relatively wider slot. The angled slot edge 36 prevents side to side movement of the thinner package. Additional angled slot edges may be provided at the back end for further securing.

FIG. 2 illustrates a cross sectional side view of the storage tray of FIG. 1 with the CD package 13 in a stored position. In this position, a front perimeter edge 38 of the CD package 13 is in contact with the angled slot edge 36 of the top slot 29. Further, a rear perimeter edge 41 of the CD package 13 rests against a back slot edge near the rear rail 21. A front portion of a bottom perimeter edge 43 of the CD package 13 rests on a front portion of the lower arc 16. In this position, the front angled slot edge 36 acts as a latch to secure the CD package 13 in the stored position.

FIG. 3 illustrates the CD package 13 of FIG. 2 in an ejected position, allowing a user to remove it from the storage tray 10 without disturbing the other items. The package 13 may be shifted from the stored position illustrated in FIG. 2 to the ejected position illustrated in FIG. 3 by a user pressing with his or her digit D as indicated in FIG. 2 tangentially upwardly against the front edge 38 of the package 13. This action causes a tangential vertical force F to be applied to the package 13 to lift it vertically as indicated in broken lines to a raised position where the bottom portion of the front perimeter edge 38 is disposed above the angled slot edge 36. In this raised position, the CD package 13 is unlatched from the angled slot edge 36. The weight of the CD package 13 causes the package to rotate or shift by falling under the force of gravity from its stored position by rotating backwardly to the ejected position illustrated in FIG. 3. In this regard, the tangentially applied vertical force causes a torque to be applied to the package 13 relative to its center of gravity, thereby causing the package 13 to rotate and to fall under the force of gravity into the ejected position shown in FIG. 3.

In the ejected position, the package 13 is supported at the rear perimeter edge 41 by the rear angled slot edge near the rear rail 21 and at the bottom perimeter edge 43 by the front angled slot edge 36. Thus, the lower portion of the front perimeter edge 38 of the CD package 13 protrudes relative to the other stored items, allowing the user to easily grasp and remove the desired item.

Figure 4:
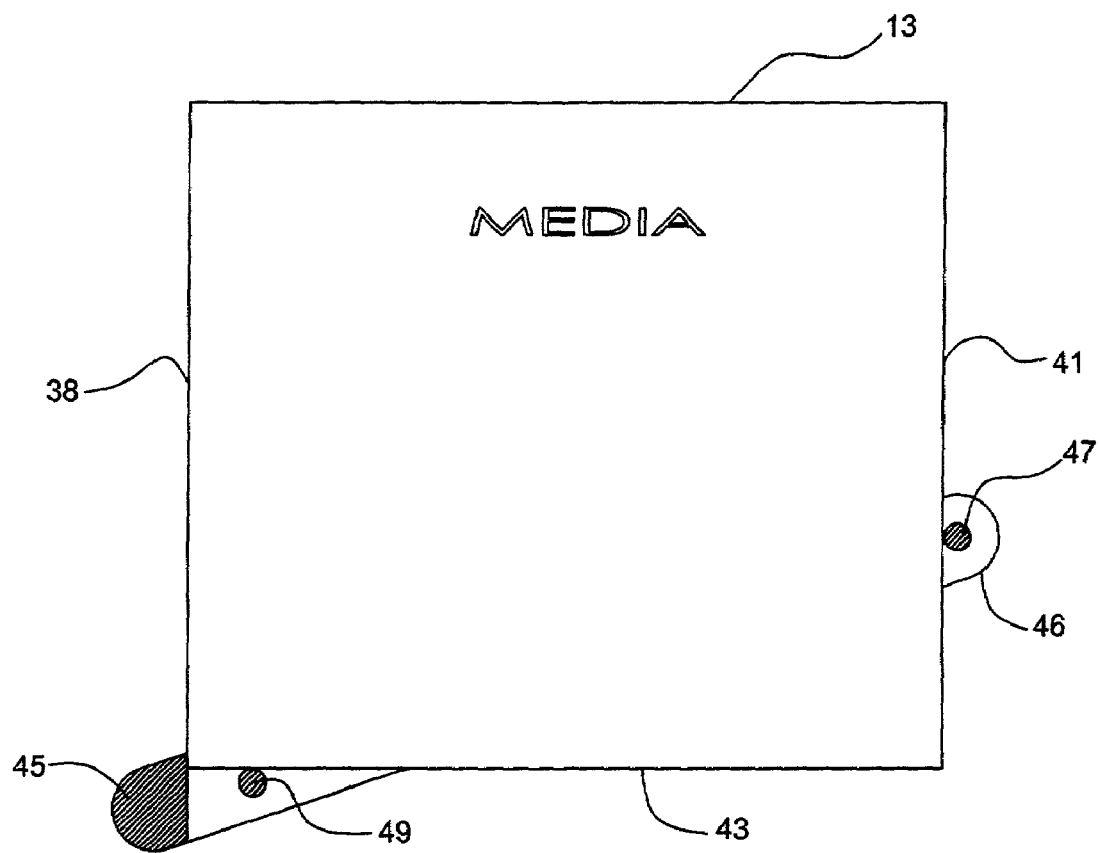
FIG. 4 is a cross-sectional side view of a storage tray according to another embodiment of the invention with an item in a stored position.
Figure 5:
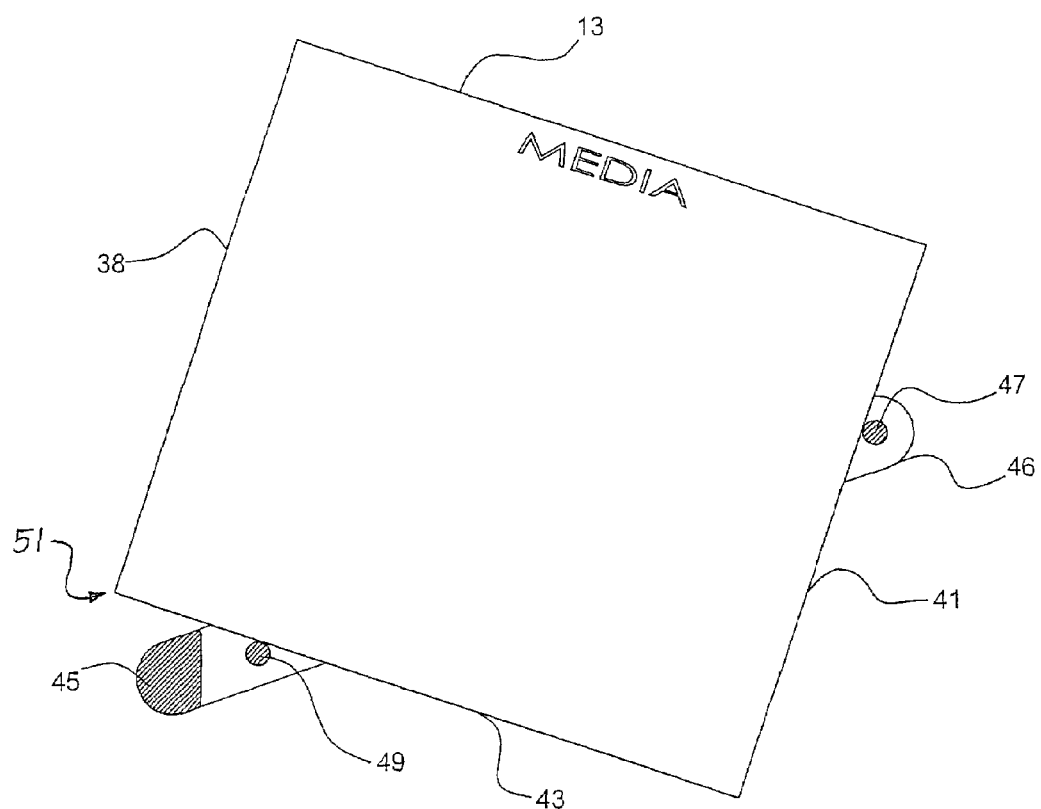
FIG. 5 is a cross-sectional side view of the storage tray of FIG. 4 with an item in an ejected position.

FIGS. 4 and 5 illustrate another embodiment of the storage tray according to the present invention. FIG. 4 illustrates the storage tray with an item such as CD package 13 in a stored position. The storage tray comprises a front rail 45 extending along a front edge of the storage tray. A plurality of flanges 46 extends from the front rail 45 towards the back of the storage tray. Slots are formed between the flanges 46 to accommodate items. Each slot is provided with a rear support peg 47 and a bottom support peg 49. The bottom support peg is located at substantially the front portion of the slot. In the stored position, the CD package 13 rests in a horizontal position with its rear perimeter edge 41 in contact with the rear support peg 47. A front portion of the bottom perimeter edge 43 of the CD package 13 rests on the bottom support peg 49. A portion of the front rail 45 acts as a latch to secure the CD package 13 in the stored position.

FIG. 5 illustrates the storage tray of FIG. 4 with the CD package 13 in the ejected position. In this position, the CD package 13 is unlatched from the portion of the front rail 45. The weight of the CD package 13 causes the package to shift into the ejected position. In this ejected position, the CD package 13 is supported by the rear support peg 47 and the bottom support peg 49. In this position, a front bottom corner 51 of the CD package 13 protrudes outward, allowing a user to grasp it for removal of the CD package 13.

Figure 6:
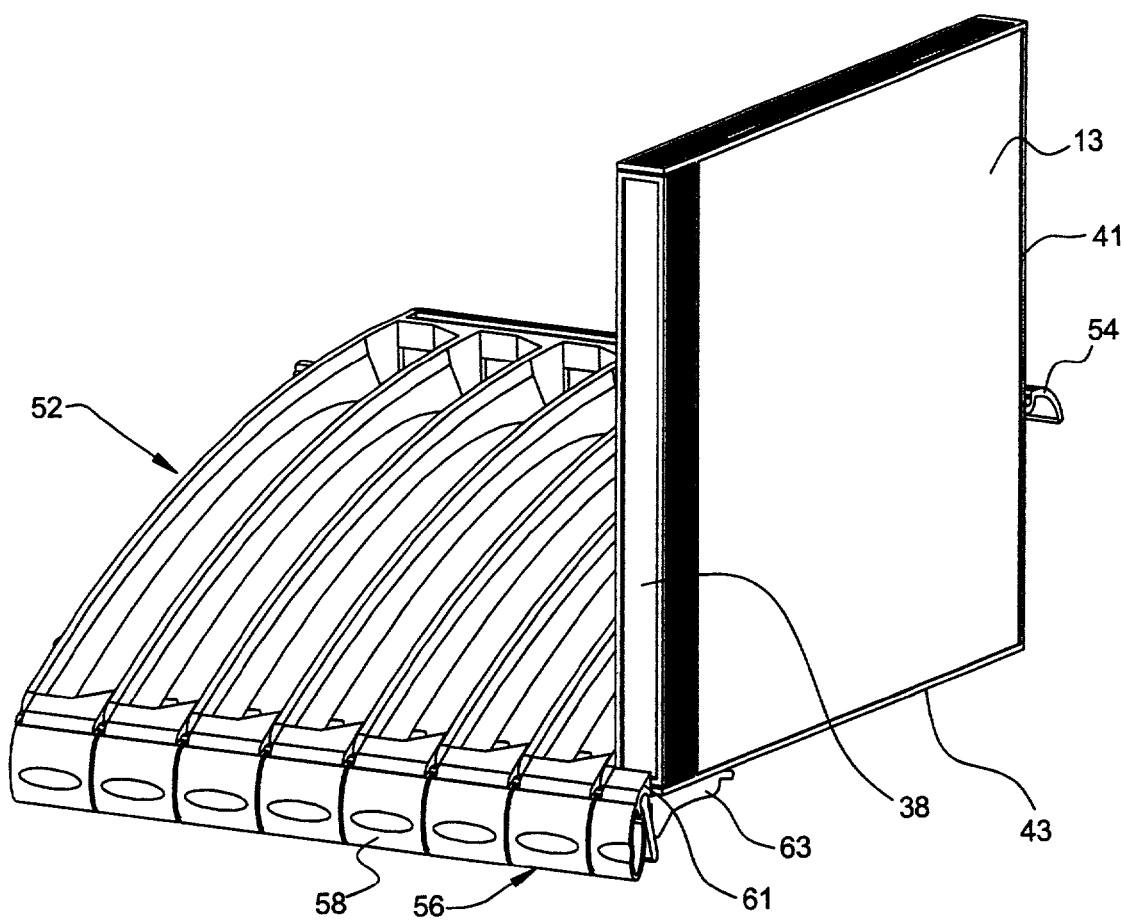
FIG. 6 is a pictorial diagram of a storage tray according to a further embodiment of the invention.
Figure 7:
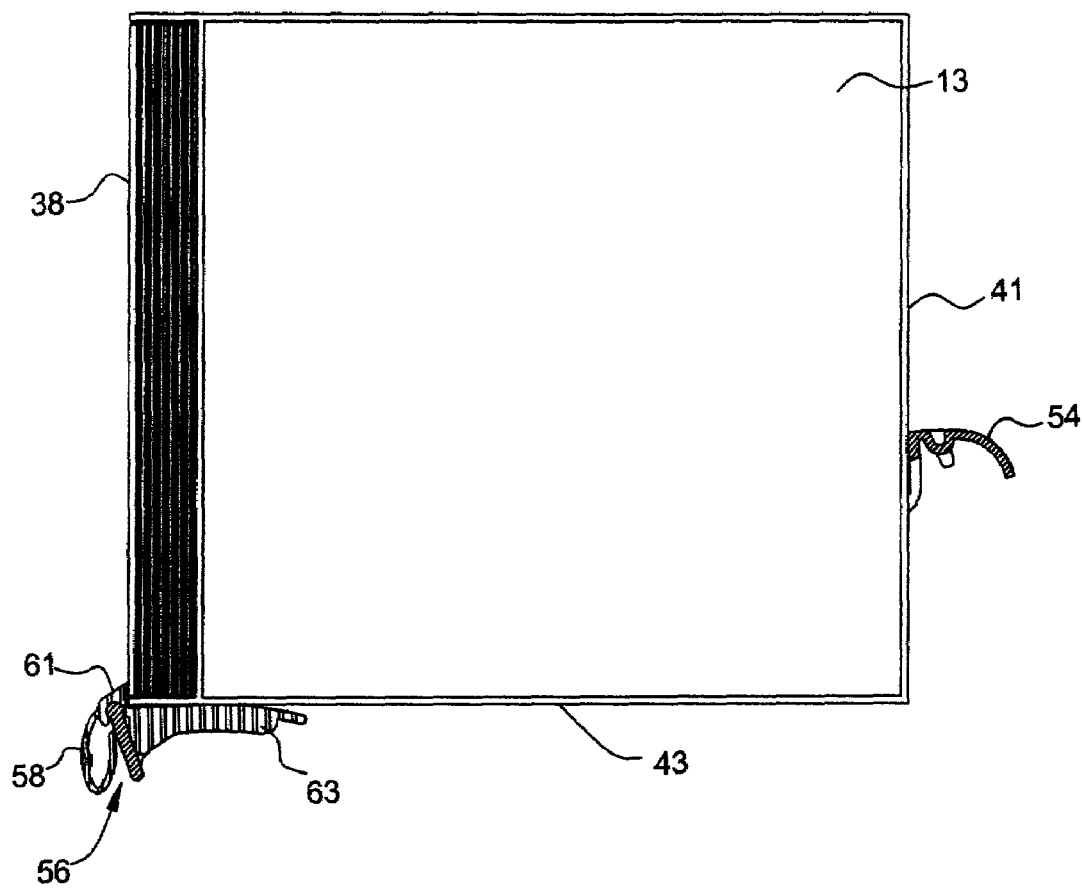
FIG. 7 is a cross-sectional side view of the storage tray of FIG. 6 with an item in a stored position.
Figure 8:
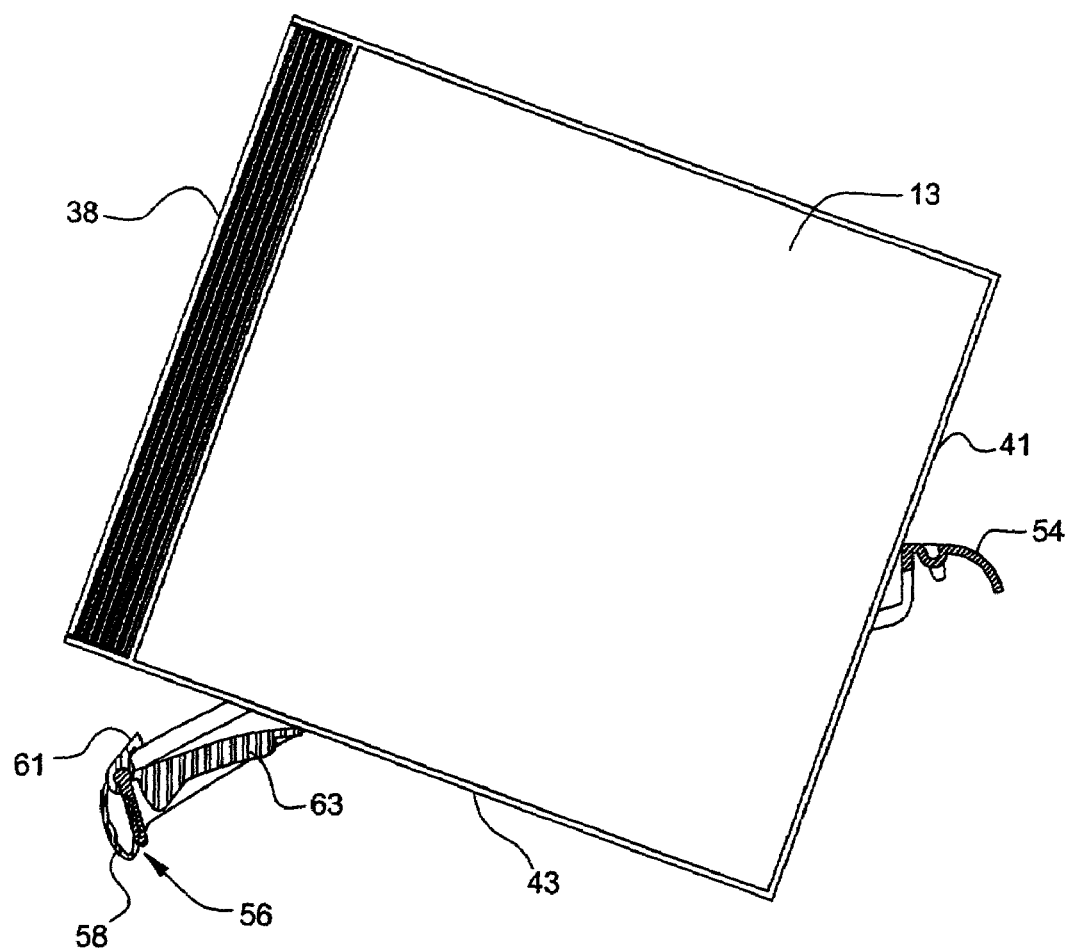
FIG. 8 is a cross-sectional side view of the storage tray of FIG. 6 with an item in an ejected position.

FIGS. 6 through 8 illustrate yet another embodiment of a storage tray according to the present invention. In this embodiment, a storage tray 52 comprises a rear rail 54 and a latch support mechanism 56 in the front portion of the storage tray. The latch support mechanism 56 functions to shift an item, such as CD package 13, from a stored position to an ejected position. The latch support mechanism 56 comprises a push-button 58 which allows a user to actuate the latch support mechanism. A latch 61 is formed to engage a bottom portion of the front perimeter edge 38 of the CD package 13. The latch support mechanism 56 also comprises an elongated bottom support 63. The bottom support 63 is adapted to support a front portion of the bottom perimeter edge 43 of the CD package 13, as illustrated in FIG. 7.

When a user applies force to the push button 58, the bottom support 63 is actuated upward, forcing the CD package 13 to unlatch from the latch 61 of the latch support mechanism 56. In this ejected position, as illustrated in FIG. 8, the CD package 13 is supported by the rear rail 54 and a portion of the bottom support 63. In this position, a bottom portion of the front perimeter edge 38 of the CD package 13 protrudes outward, allowing a user to grasp it for easy removal. In another embodiment, the push button 58 may be biased by a spring to the position illustrated in FIG. 7. When a user applies pressure to the push button 58, the user may exert a force against the spring. When the user releases the force, the push button 58 returns to the position illustrated in FIG. 7.

Figure 9:
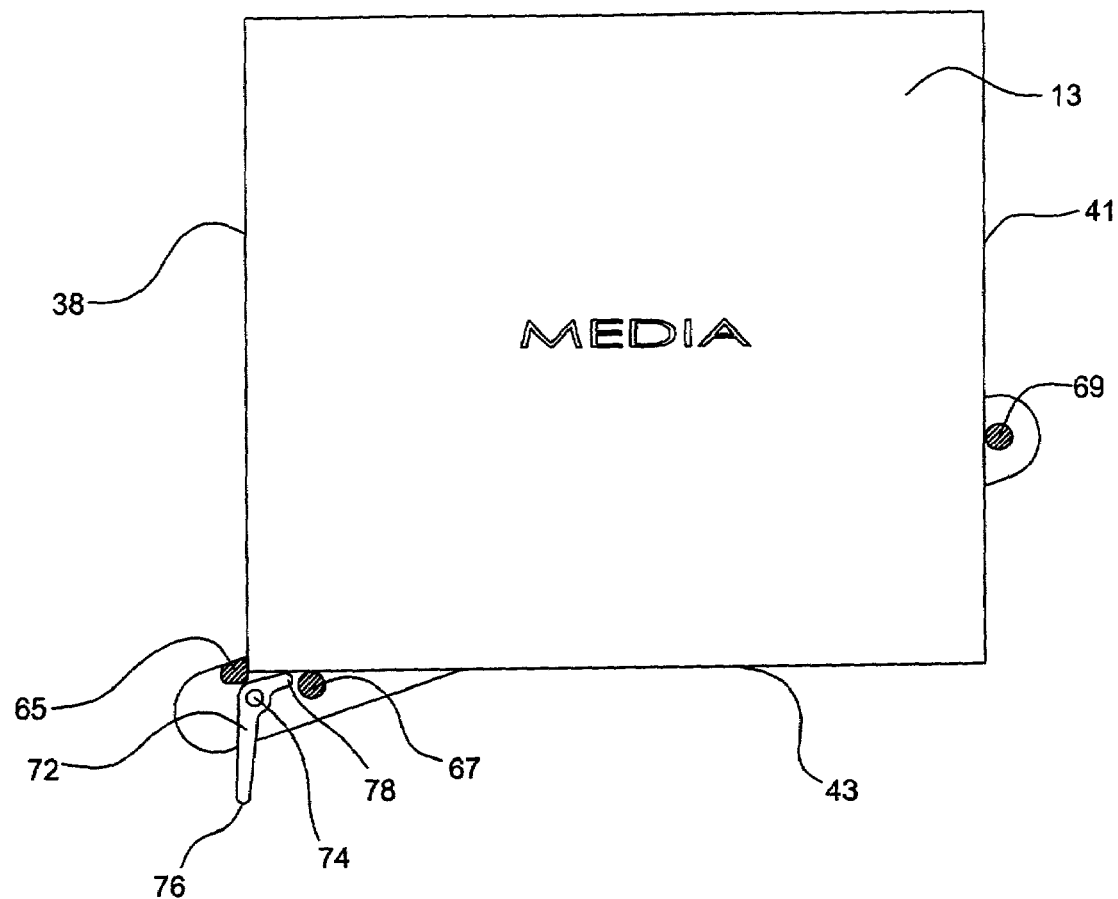
FIG. 9 is a cross-sectional side view of a storage tray according to a still further embodiment of the invention with an item in a stored position.
Figure 10:
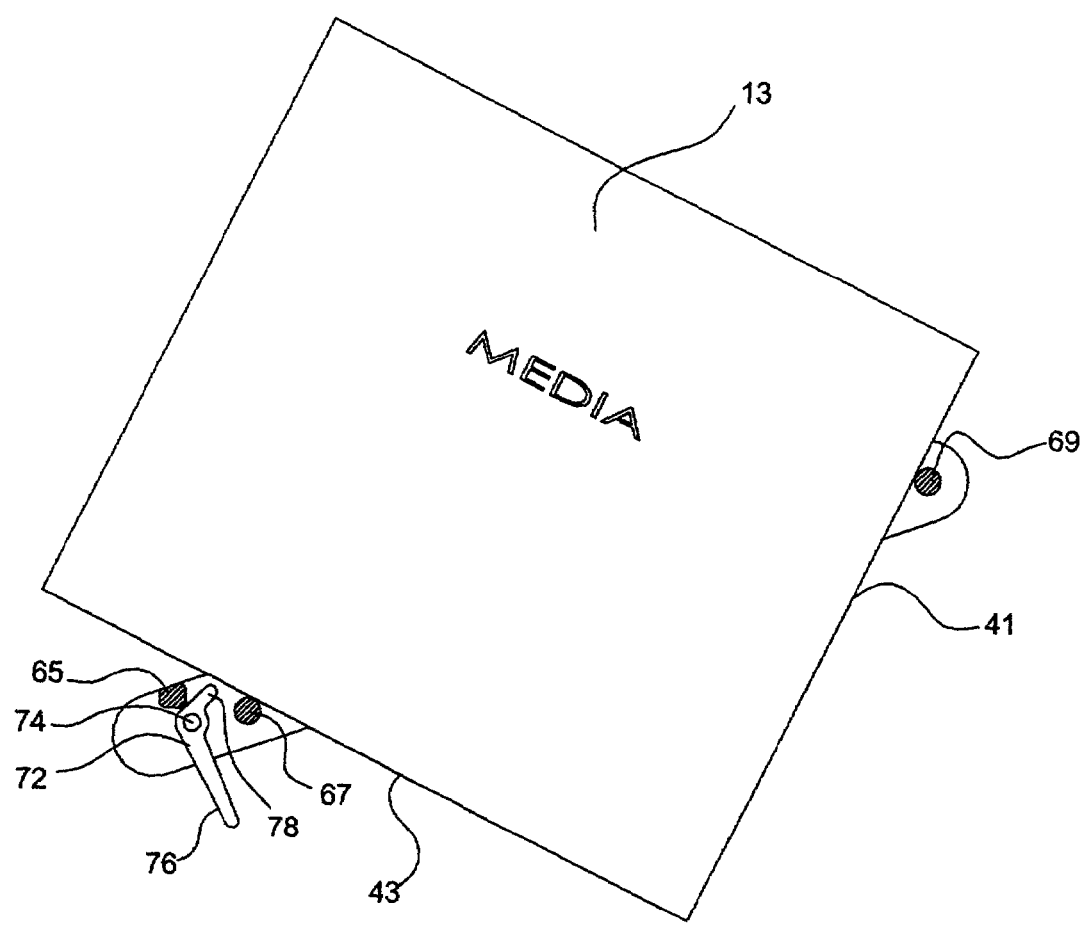
FIG. 10 is a cross-sectional side view of the storage tray of FIG. 9 with an item in an ejected position.

FIGS. 9 and 10 illustrate another embodiment of a storage tray according to the present invention. The storage tray illustrated in FIG. 9 comprises a fixed front latch portion 65, a fixed bottom support peg 67, and a fixed rear support peg 69. In the stored position, as illustrated in FIG. 9, the CD package 13 is in contact with each of the front latch portion 65, the bottom support peg 67 and the rear support peg 69. An actuator 72 is provided to shift the CD package 13 from its stored position to an ejected position. The actuator 72 comprises a lever 76 and an integrated lifter 78 adapted to rotate about a pivot 74. The lever 76 may be pressed by a user to apply force to the actuator 72. The applied force causes the lifter 78 to force the CD package 13 above the front latch portion 65, causing the CD package 13 to shift to the ejected position illustrated in FIG. 10.

Figure 11:
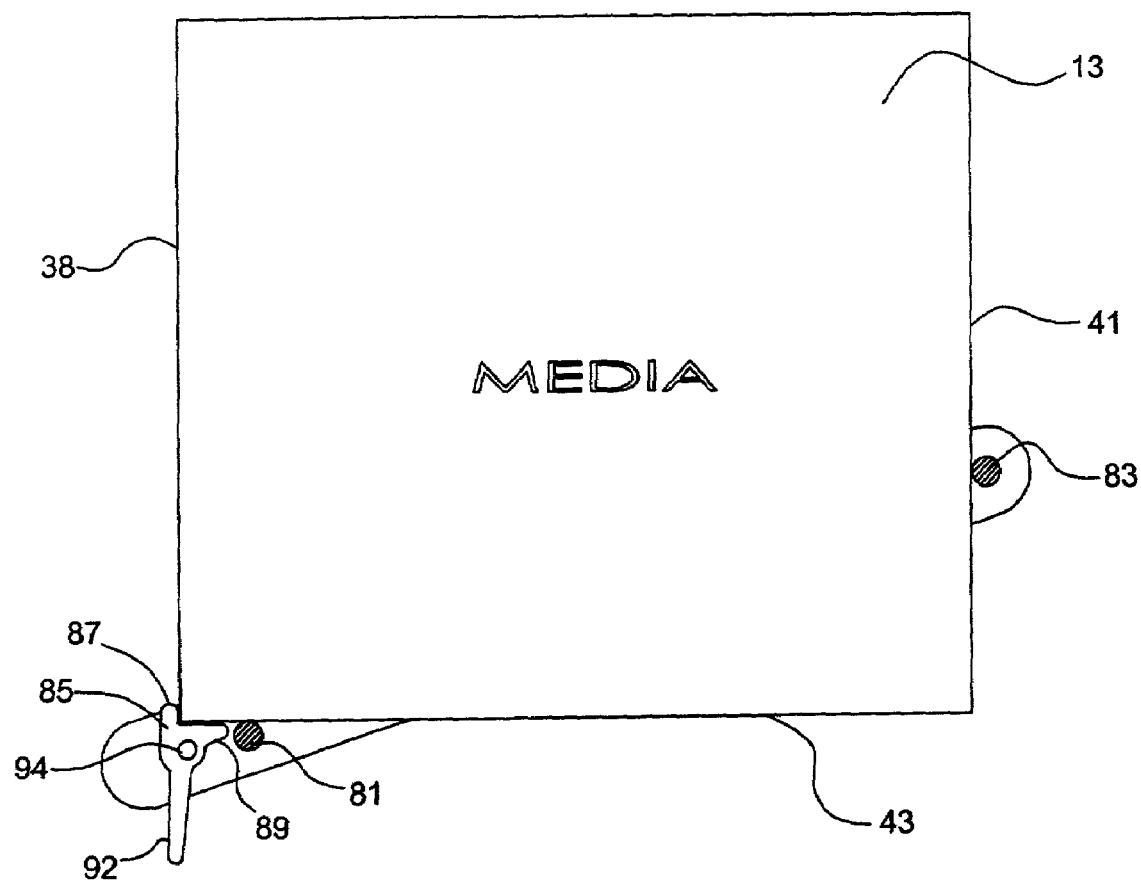
FIG. 11 is a cross-sectional side view of a storage tray according to yet another embodiment of the invention with an item in a stored position.
Figure 12:
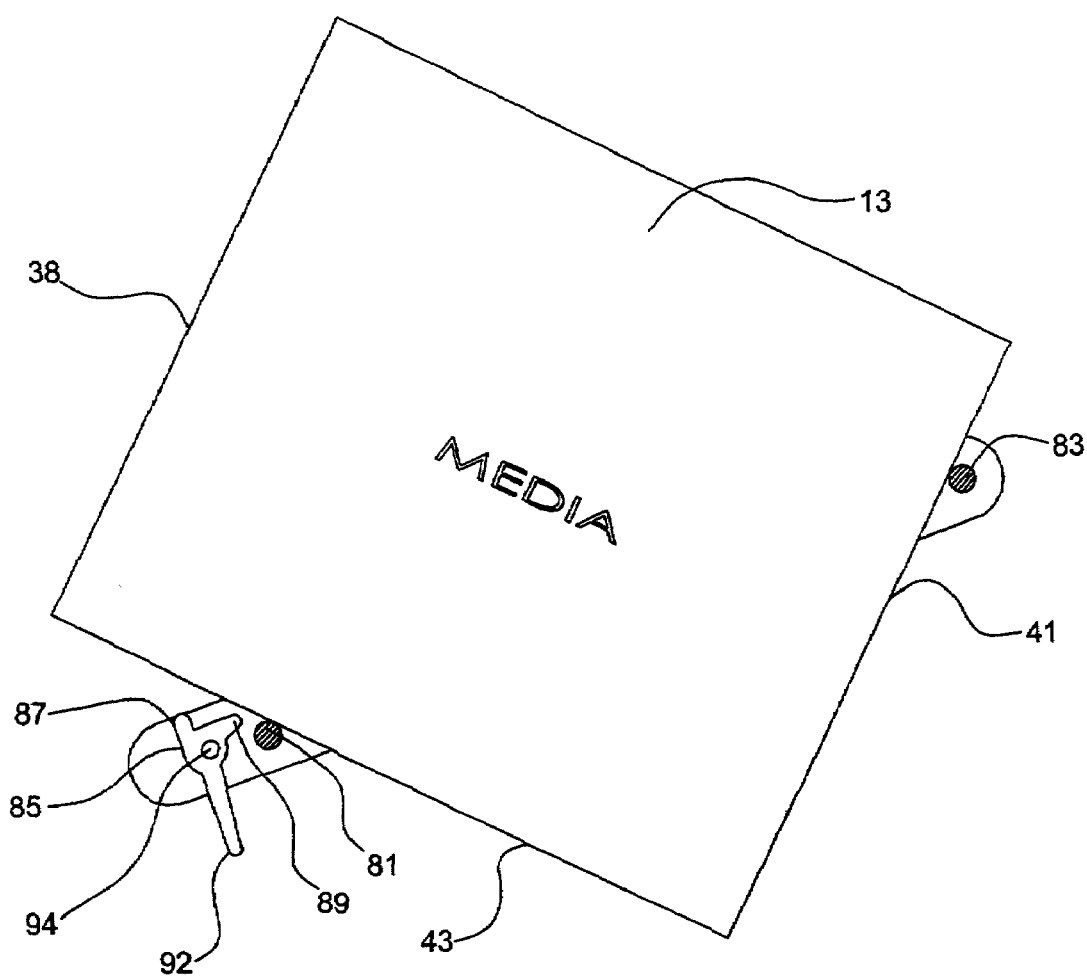
FIG. 12 is a cross-sectional side view of the storage tray of FIG. 11 with an item in an ejected position.

FIGS. 11 through 12 illustrate another embodiment of a storage tray according to the invention. The embodiment illustrated in FIGS. 11 through 12 is similar to that illustrated in FIGS. 9 through 10, but with an integrated latch and lifter system. As illustrated in FIGS. 11 through 12, the storage tray comprises a fixed bottom support peg 81 and a fixed rear support peg 83. An integrated latching mechanism 85 comprises a front latch portion 87 integrated with a lifter 89 and a lever 92. The integrated latching mechanism 85 is adapted to rotate about a pivot 94. Thus, when a user applies force to a lever 92, the lifter 89 and the front latch portion 87 rotate, causing the CD package 13 to unlatch from the latch 87. Once unlatched, the CD package 13 falls into its ejected position, as illustrated in FIG. 12. In another embodiment, the fixed bottom support peg 81 may be eliminated. Thus, the front of the bottom perimeter edge 43 of the CD package 13 would rest on the lifter 89 of the front latch portion 87 rather than on the fixed bottom support peg 81.

Figure 13:
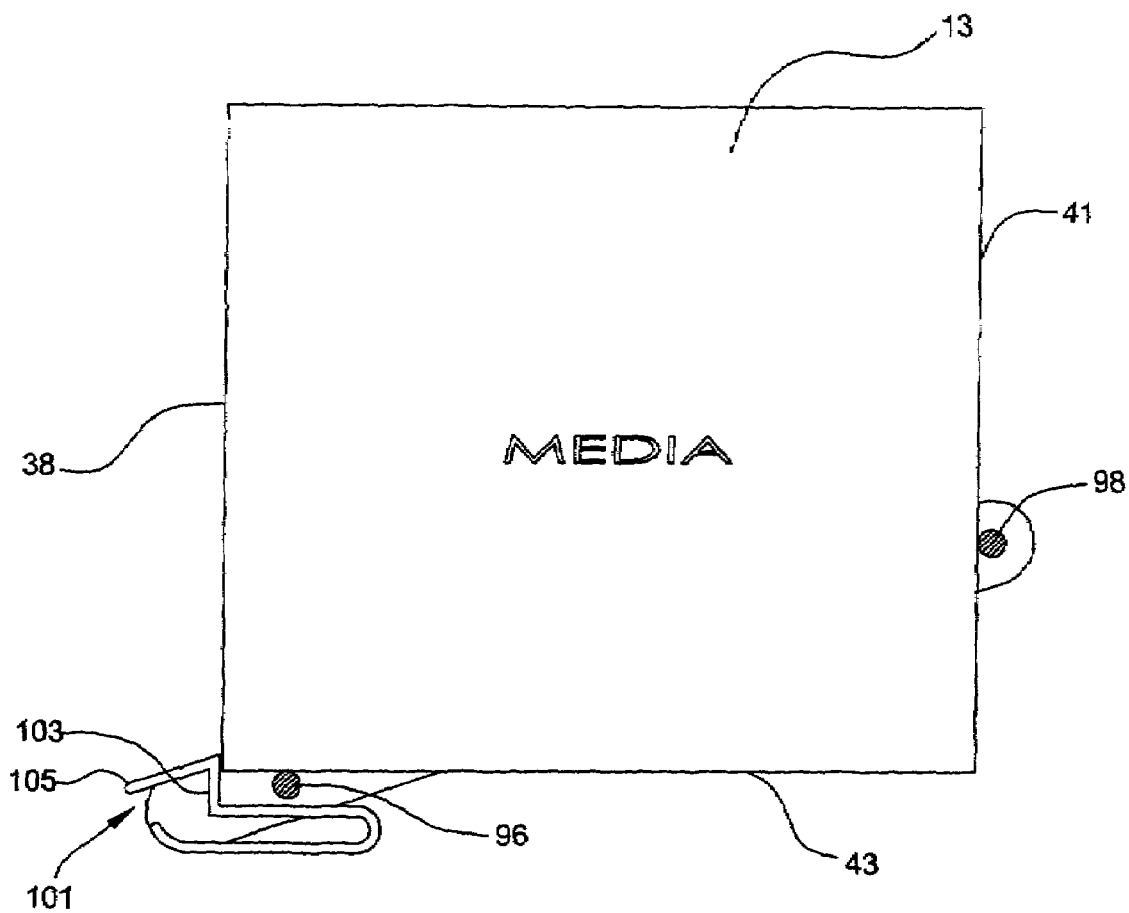
FIG. 13 is a cross-sectional side view of a storage tray according to yet a further embodiment of the invention with an item in a stored position.
Figure 14:
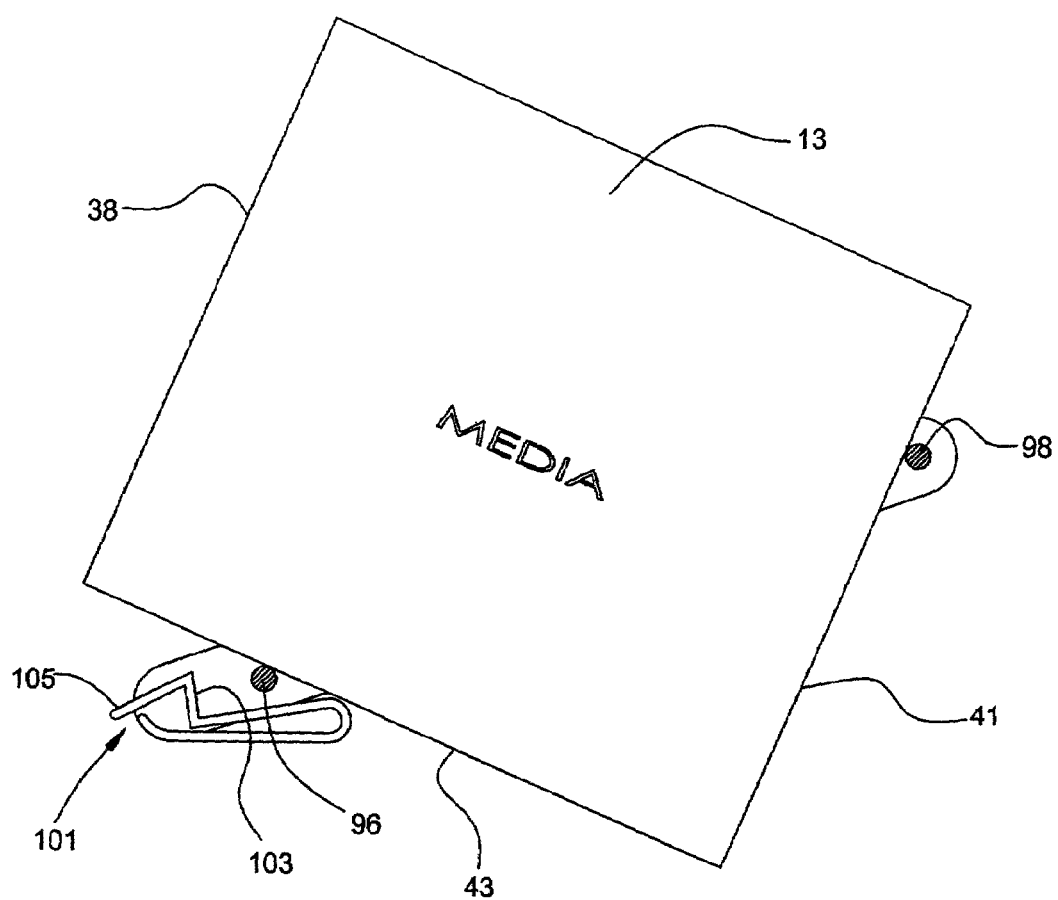
FIG. 14 is a cross-sectional side view of the storage tray of FIG. 13 with an item in an ejected position.

FIGS. 13 through 14 illustrate yet another embodiment of a storage tray according to the present invention. As with the embodiment illustrated in FIGS. 11 through 12, the embodiment of FIGS. 13 through 14 also comprises a fixed bottom support peg 96 and a fixed rear support peg 98. The embodiment of FIGS. 13 through 14 comprises a latching mechanism 101 having a front latch portion 103 and a resilient lever portion 105. In the stored position, the CD package 13 is supported on its rear perimeter edge 41 by the fixed rear support peg 98, on the bottom perimeter edge 43 by the fixed bottom support pet 96, and at a bottom portion of the front perimeter edge 38 by the front latch portion 103. When a user presses down on the resilient lever portion 105, the bottom portion of the front perimeter edge 38 of the CD package 13 is unlatched from the front latch portion 103. The weight of the CD package 13 causes the package 13 to shift to its ejected position, illustrated in FIG. 14. One embodiment of the storage tray may be formed with a unibody construction.

FIGS. 15 through 18 illustrate a further embodiment of a storage tray according to the present invention. A storage tray 107 is provided to store items such as a DVD package 109. The storage tray 107 comprises a tray body 112 having a front rail 114. A series of partitions 116 protrude from the front rail 114 rearwardly. The partitions 116 form slots therebetween for accommodating items such as DVD 109. Each slot may be provided with a rear peg 118, which may be in the form of a back rail. A bottom front support peg 121 and a bottom back support peg 123 may be provided to support the DVD package 109 in the slot.

Figure 16:
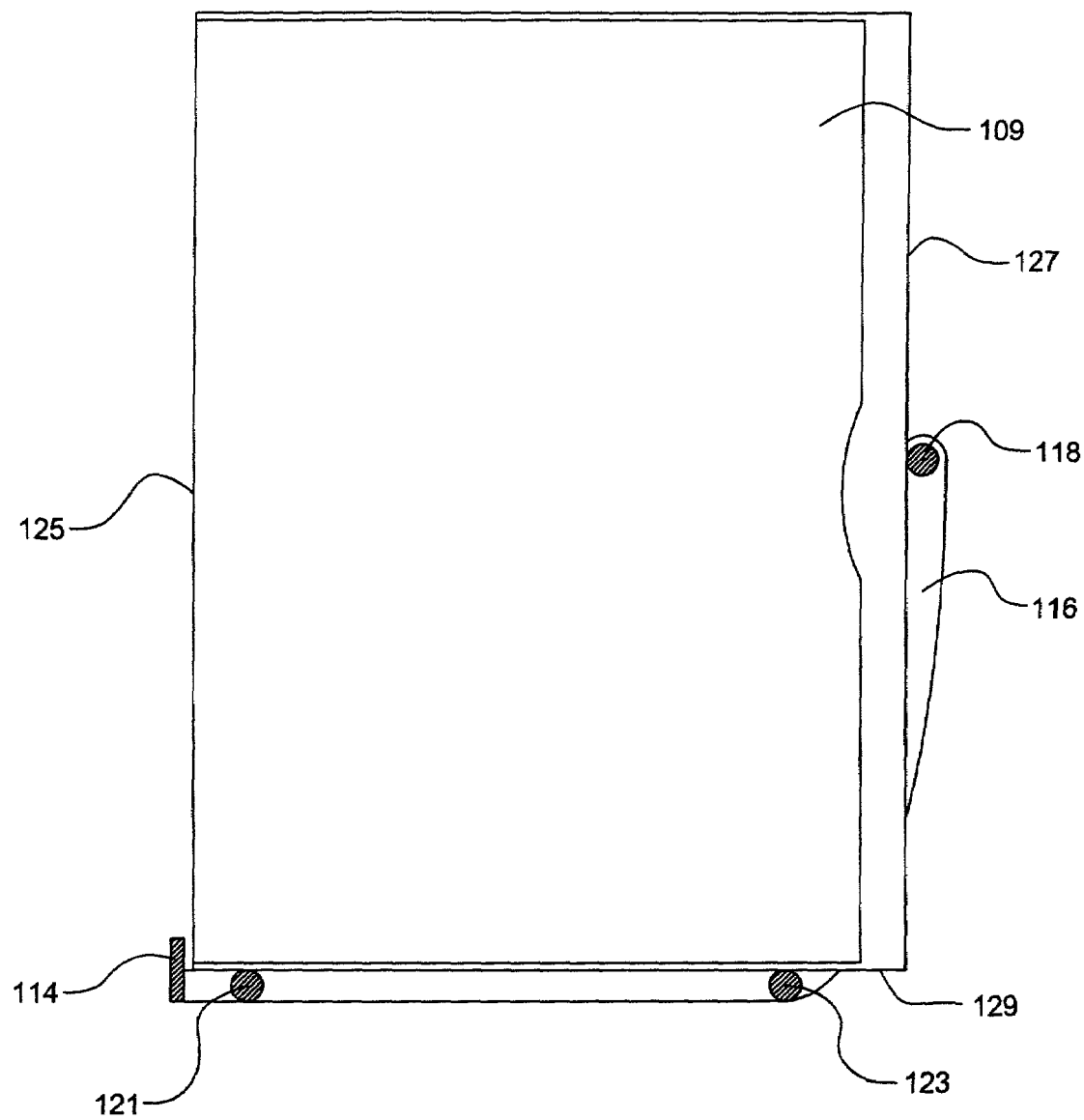
FIG. 16 is a cross-sectional side view of the storage tray of FIG. 15 with an item in a stored position.

In the stored position, as illustrated in FIG. 16, the DVD package 109 is supported by the bottom front support peg 121 and the bottom back support peg 123. In this manner, a bottom perimeter edge 129 of the DVD package 109 rests on the two bottom support pegs 121, 123. The rear peg 118 may act as a backstop contacting a rear perimeter edge 127 of the DVD package 109.

Figure 15:
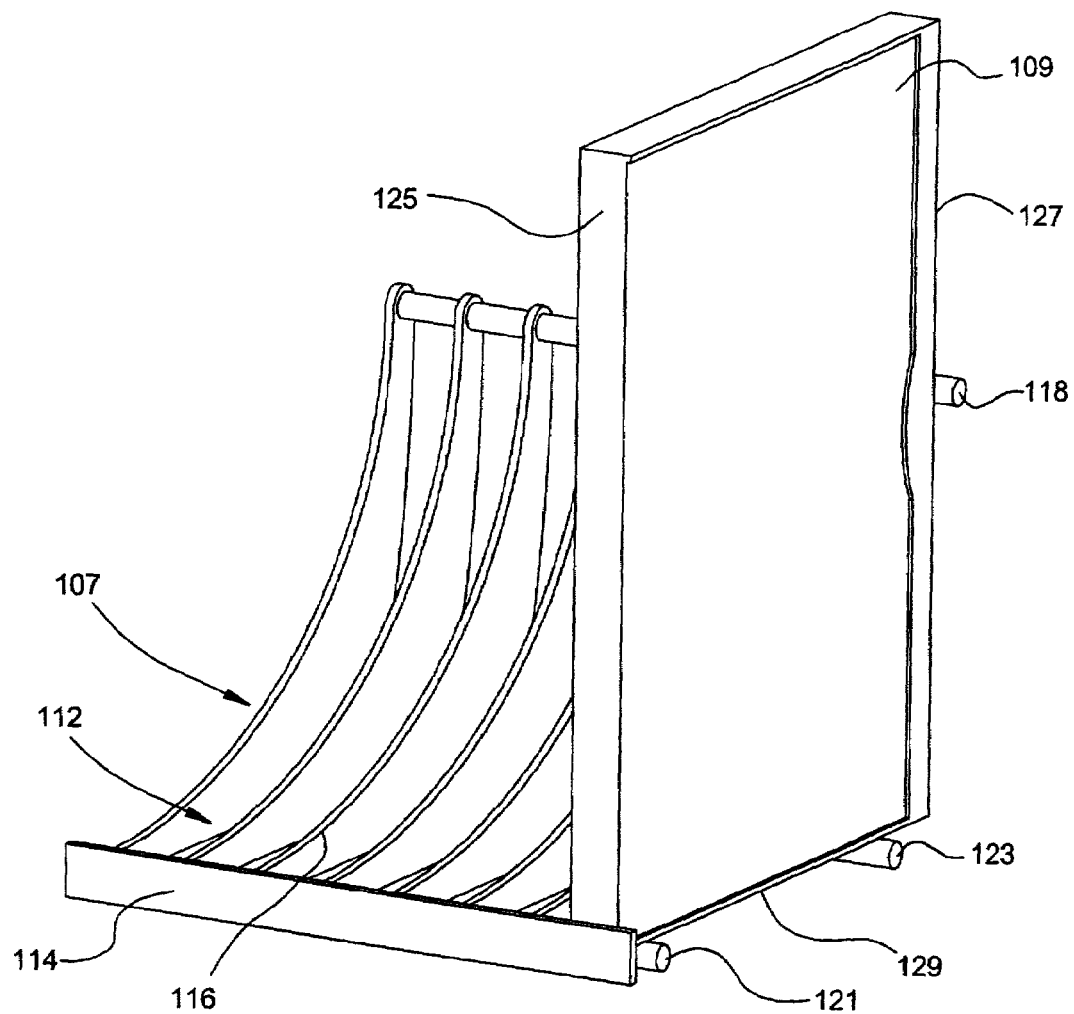
FIG. 15 is a pictorial diagram of a storage tray according to yet another embodiment of the invention.
Figure 17:
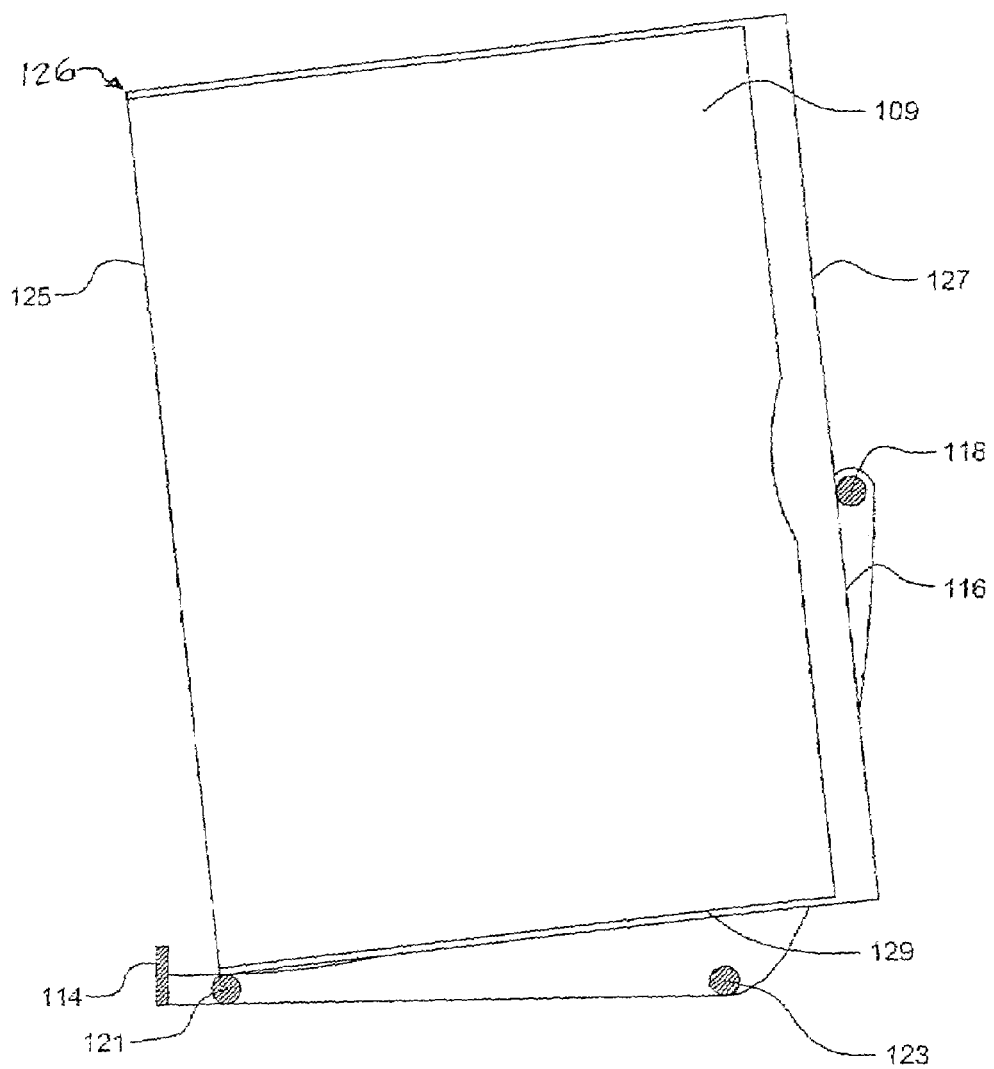
FIG. 17 is a cross-sectional side view of the storage tray of FIG. 15 with an item in a transition state.
Figure 18:
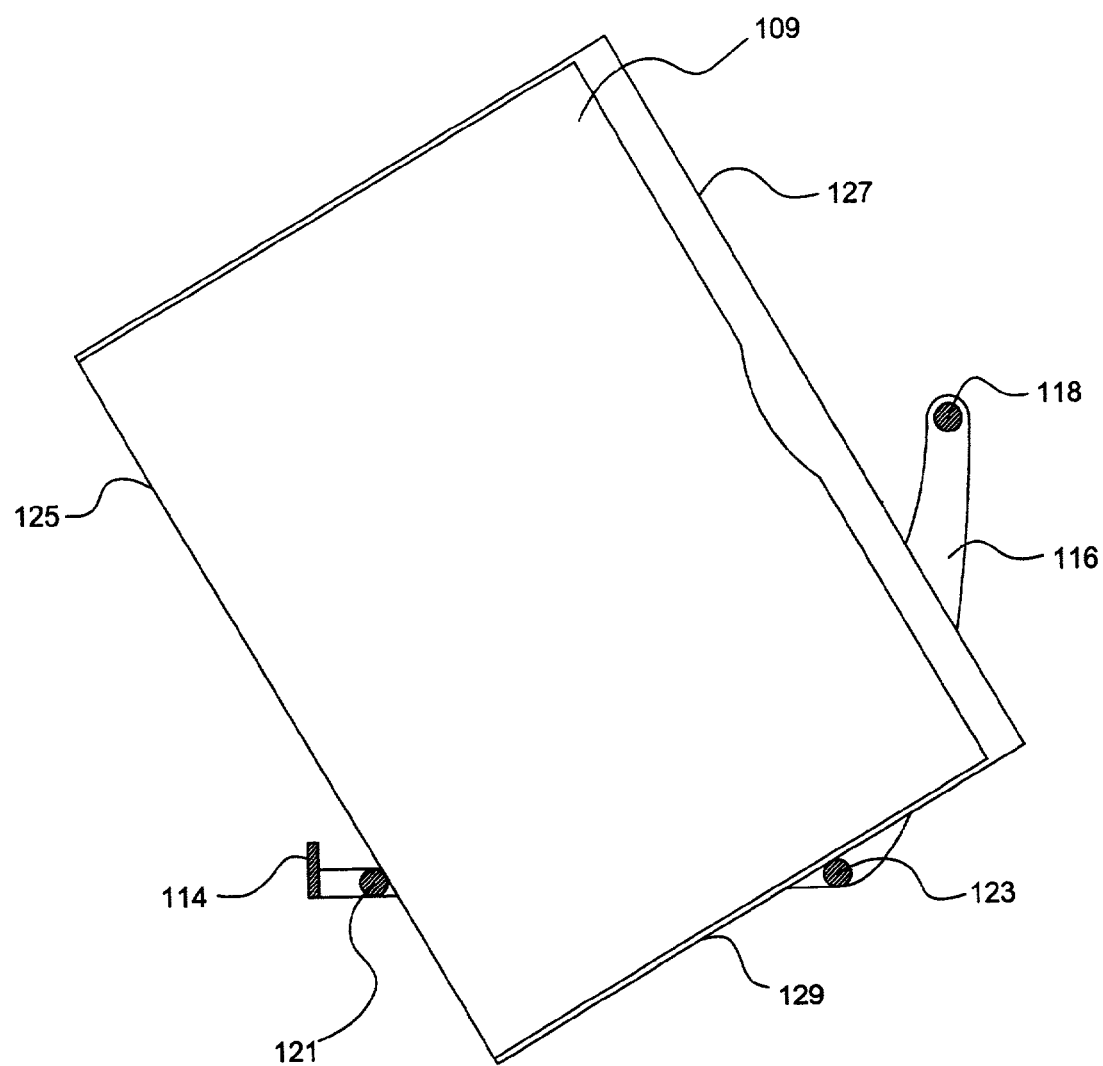
FIG. 18 is a cross-sectional side view of the storage tray of FIG. 15 with an item in an ejected position.

FIG. 17 illustrates the storage tray of FIGS. 15 and 16 with the DVD package 109 in a transition from its stored position to an ejected position. When force is applied to a bottom portion of a front perimeter edge 125 of the DVD package 109, as illustrated in FIG. 17, the DVD package 109 is forced against the rear peg 118 and rotates so that a top portion 126 of the front perimeter edge 125 of the DVD package 109 is moved forward. As force is continued to be applied, the DVD package 109 shifts to its ejected position, illustrated in FIG. 18. In the ejected position, the bottom perimeter edge 129 of the DVD package 109 is supported on the bottom back support peg 123, and the front perimeter edge 125 of the DVD package 109 is supported on the bottom front support peg 121. In this position, the top portion of the front perimeter edge 125 of the DVD package 109 protrudes forward, allowing a user to easily grasp and remove the desired DVD package 109.

FIGS. 19 through 22 illustrate another embodiment of a storage tray according to the present invention. A storage tray 132 is provided with partitions 134 forming slots therebetween to accommodate items such as videotape 109. Each slot is provided with a fixed rear peg 136 and a fixed bottom back peg 138. A movable support mechanism 141 is provided near the front portion of the storage tray 132. The movable support mechanism 141 comprises a push button 143 for actuating the mechanism 141 and a movable support 145 for shifting an item from a stored position to an ejected position.

Figure 19:
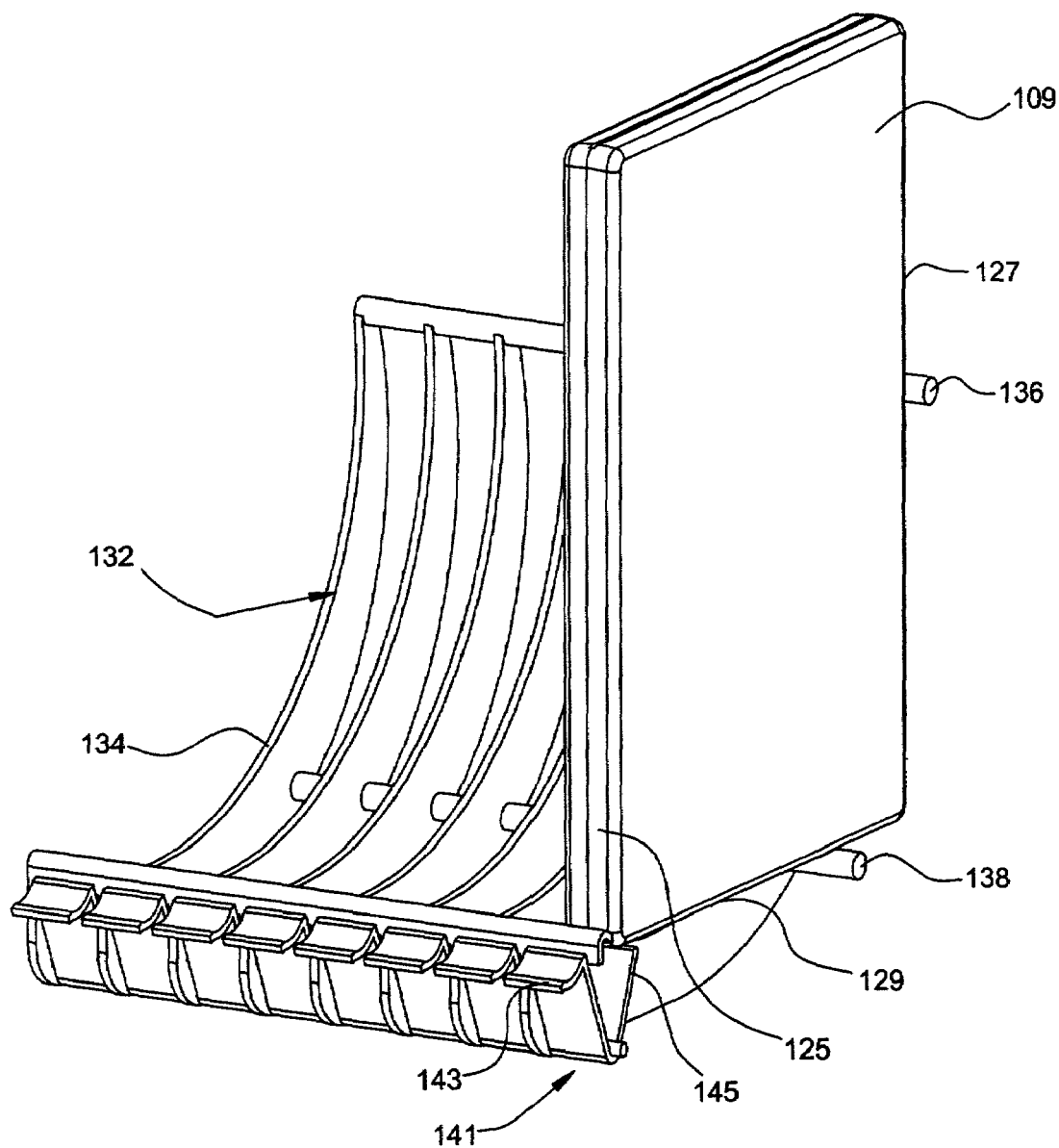
FIG. 19 is a pictorial diagram of a storage tray according to a still further embodiment of the invention.
Figure 20:
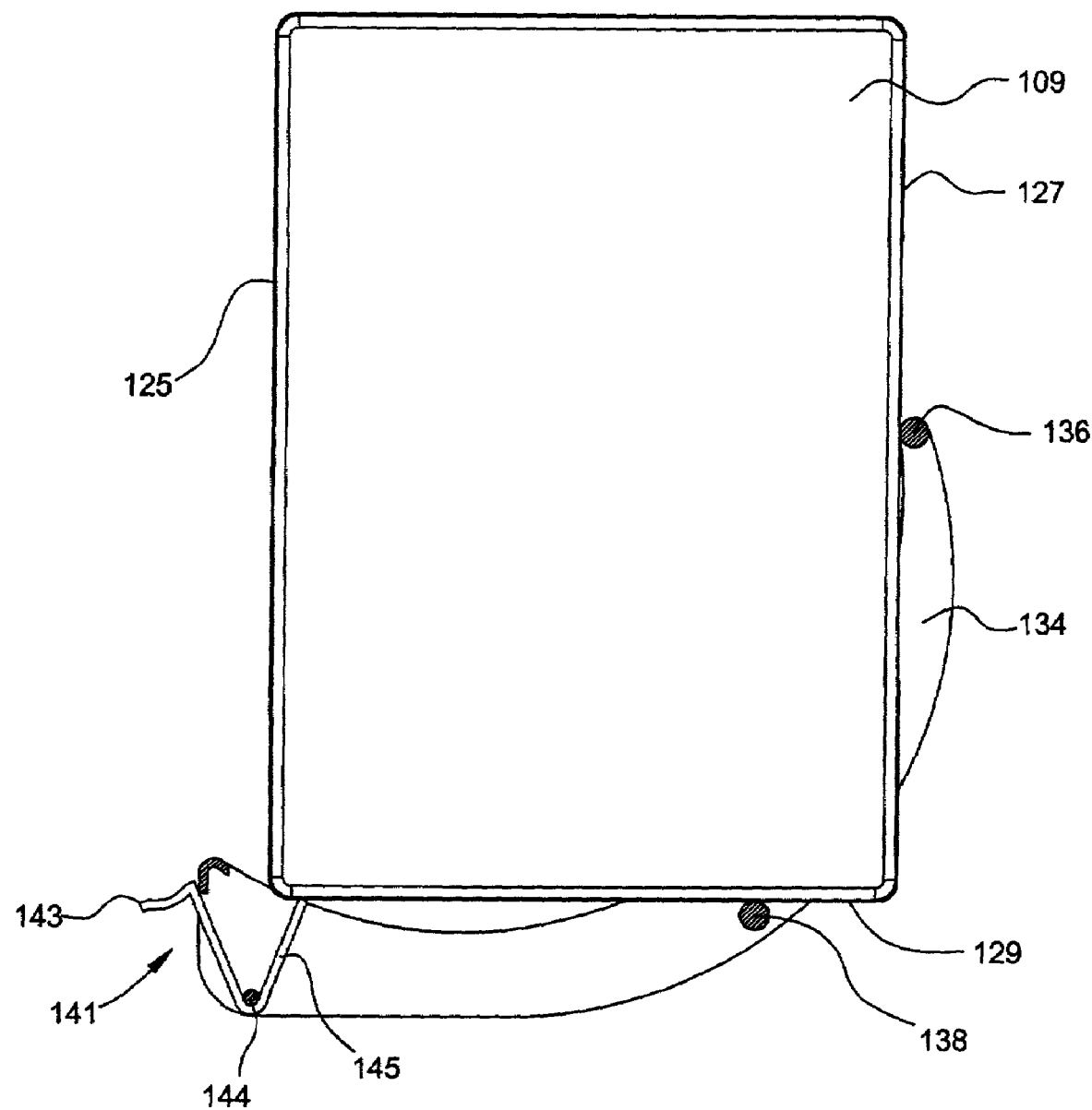
FIG. 20 is a cross-sectional side view of the storage tray of FIG. 19 with an item in a stored position.
Figure 21:
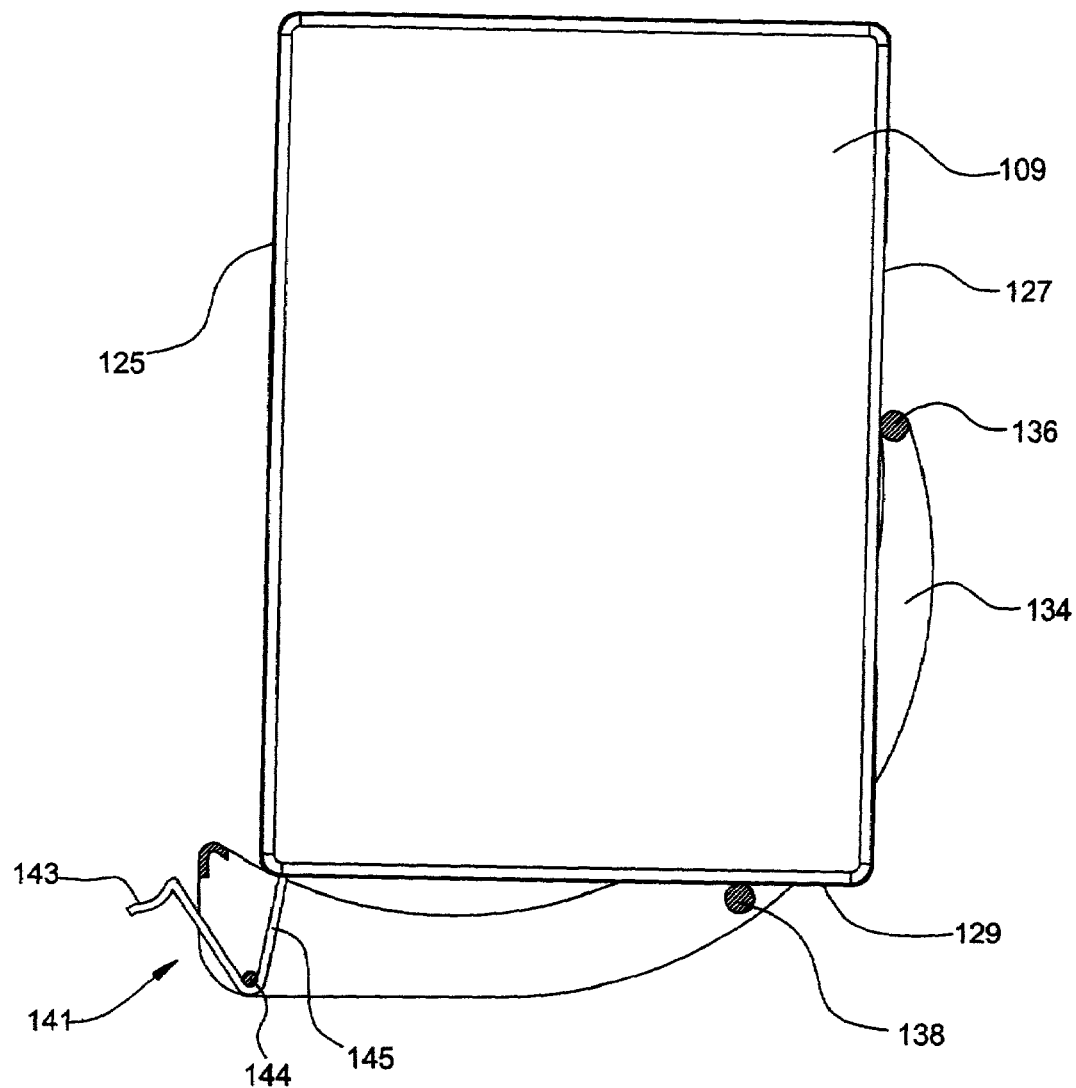
FIG. 21 is a cross-sectional side view of the storage tray of FIG. 19 with an item in a transition state.
Figure 22:
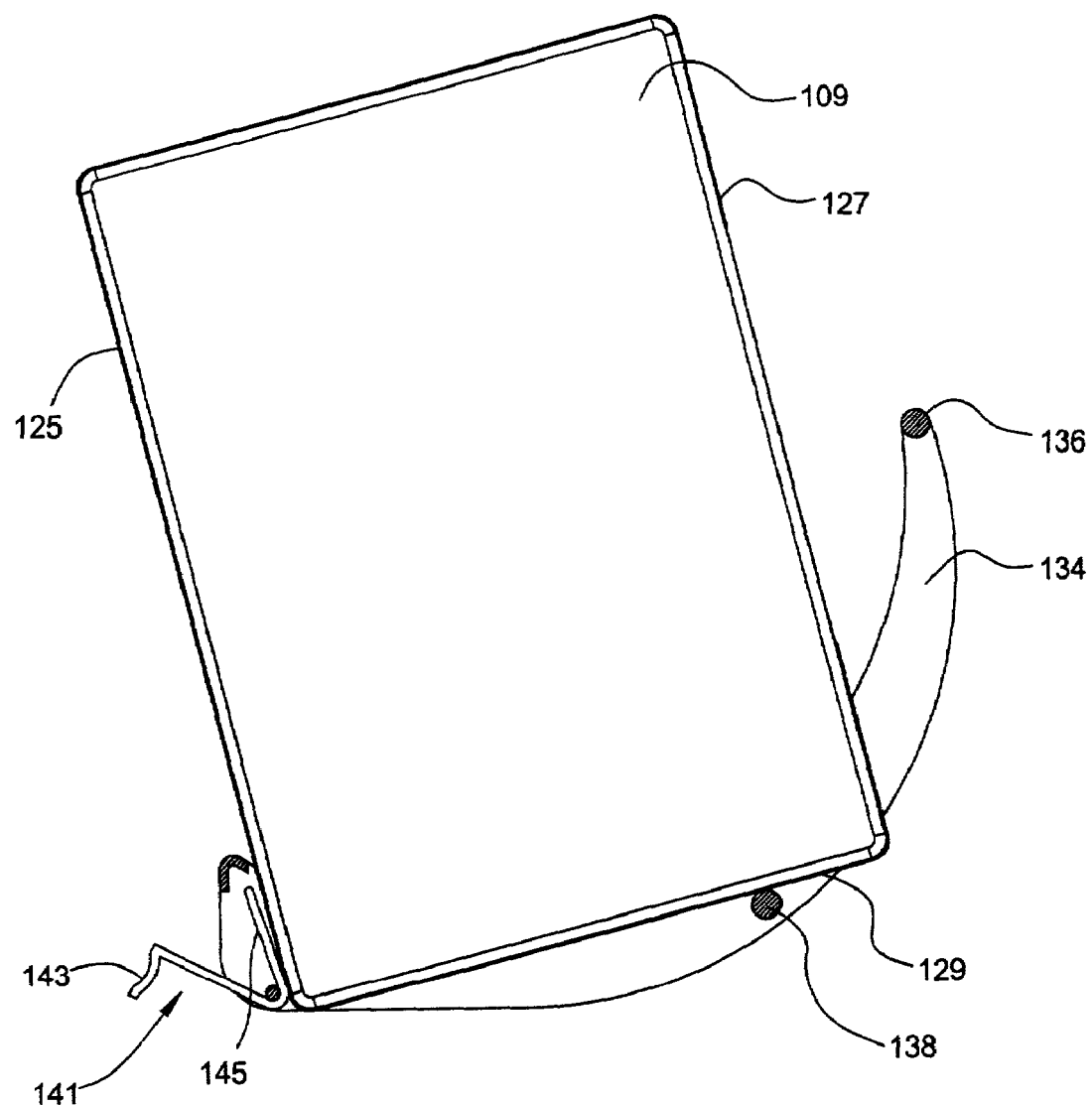
FIG. 22 is a cross-sectional side view of the storage tray of FIG. 19 with an item in an ejected position.

FIG. 20 illustrates the storage tray of FIG. 19 with a DVD package 109 in a stored position. In this position, the bottom perimeter edge 129 of the DVD package 109 is supported by the bottom back peg 138 and the tip of the moveable support 145. The rear peg 136 acts as a backstop. As illustrated in FIG. 21, when a user applies a force to the push button 143 of the movable support mechanism 141, the movable support mechanism 141 rotates about a pivot 144. As the mechanism 141 rotates, the tip of the movable support 145 slides towards the front edge of the DVD package 109. As illustrated in FIG. 22, once the tip of the movable support 145 has moved beyond the front perimeter edge 125 of the DVD package 109, the DVD package 109 shifts to its ejected position. In the ejected position, the bottom back peg 138 supports the bottom perimeter edge 129 of the DVD package 109, and the bottom portion of the front perimeter edge 125 of the DVD package 109 rests on a flat portion of the movable support 145. In this position, the upper portion of the front perimeter edge 125 protrudes forward, allowing a user to easily remove the DVD package 109 without disturbing other adjacent items.

Figure 23:
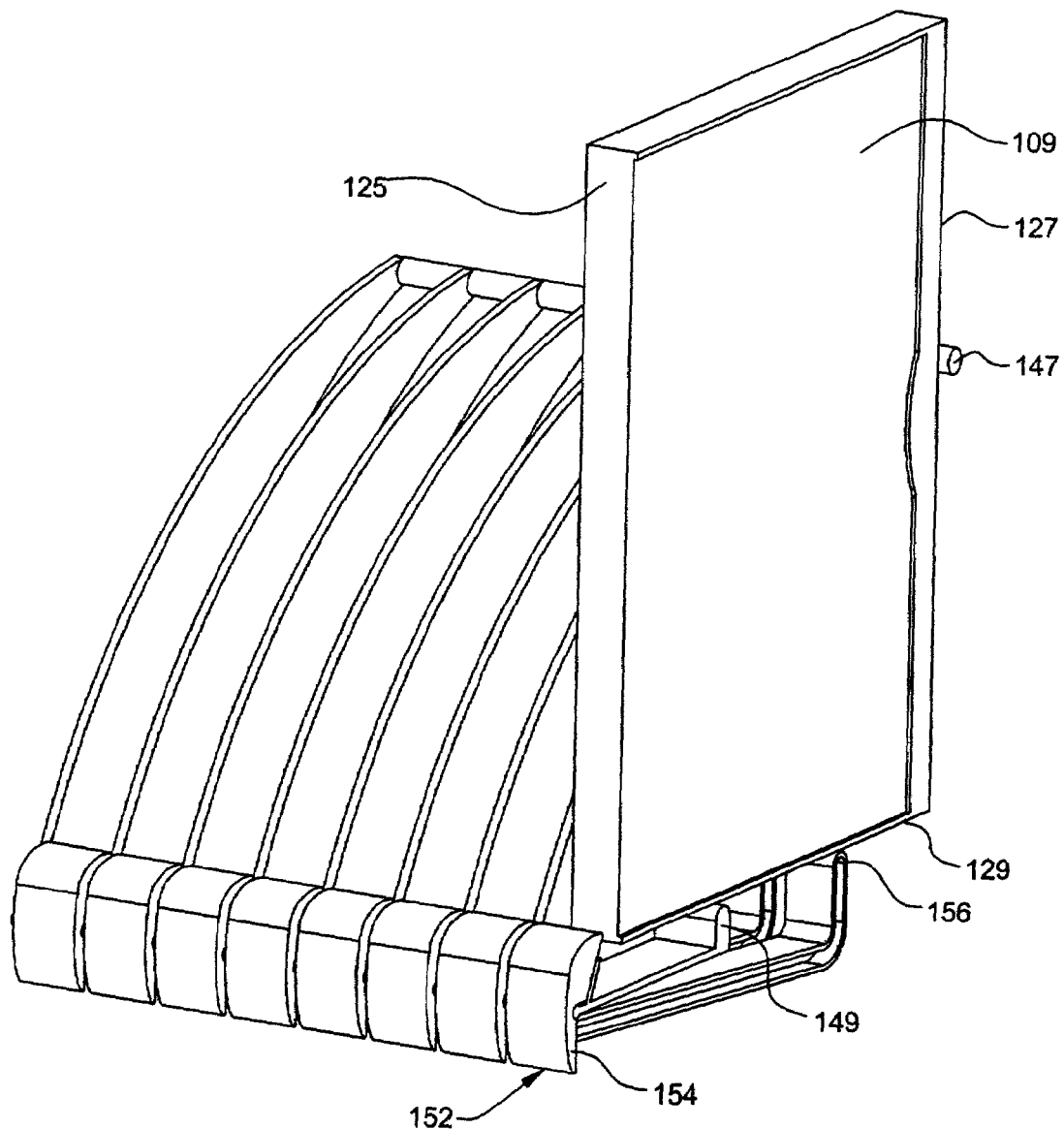
FIG. 23 is a pictorial diagram of a storage tray according to yet a further embodiment of the invention.
Figure 24:
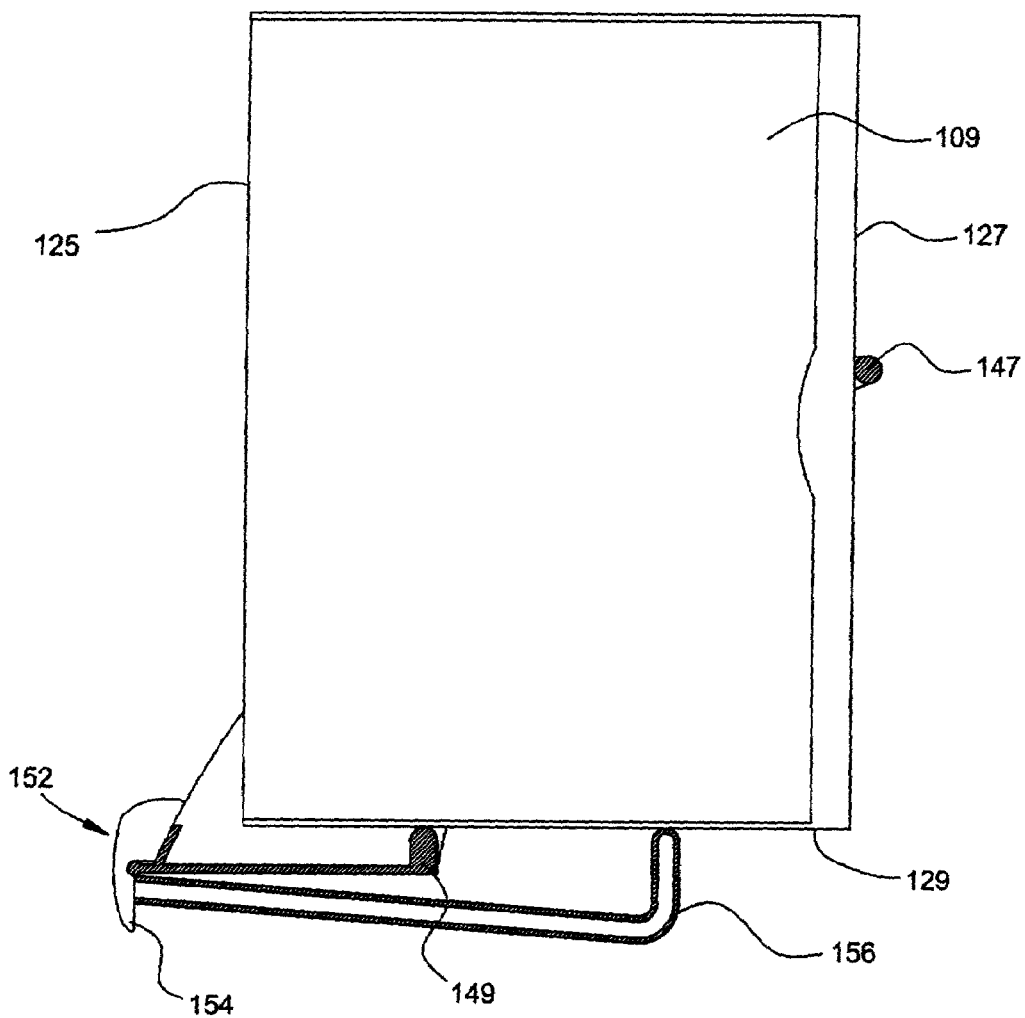
FIG. 24 is a cross-sectional side view of the storage tray of FIG. 23 with an item in a stored position.
Figure 25:
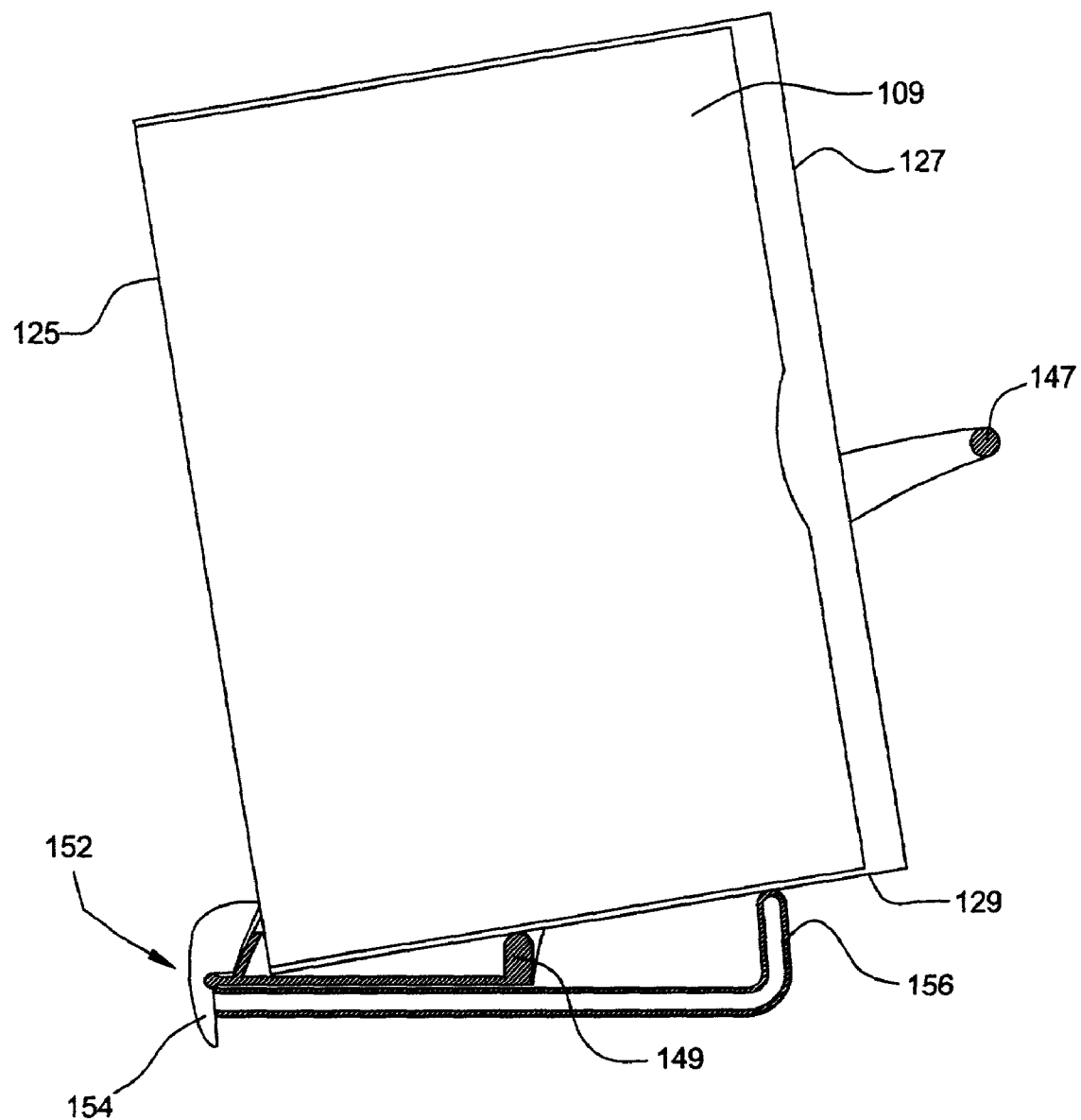
FIG. 25 is a cross-sectional side view of the storage tray of FIG. 23 with an item in an ejected position.

FIGS. 23 through 25 illustrate an additional embodiment of the storage tray according to the present invention. Items such as DVD package 109 are supported in one of a plurality of slots, each slot having a rear peg 147. A bottom front fixed support 149 is provided to support the DVD package 109 on its bottom perimeter edge 129. An actuator assembly 152 is provided to shift the DVD package 109 from a stored position to an ejected position. The actuator assembly 152 comprises a push button 154 and a lifter 156. The lifter 156 is adapted to be actuated by the push button 154. The lifter also acts to support a rear portion of the bottom perimeter edge 129 of the DVD package 109, as illustrated in FIG. 24. When a user applies force to the push button 154, the push button 154 actuates the lifter 156 in an upward manner, thereby tilting the DVD package 109 forward. In this position, the DVD package 109 may be supported by the lifter 156 and a portion of the push button 154 at the front perimeter edge 125 of the DVD package 109, as illustrated in FIG. 25.

Figure 26:
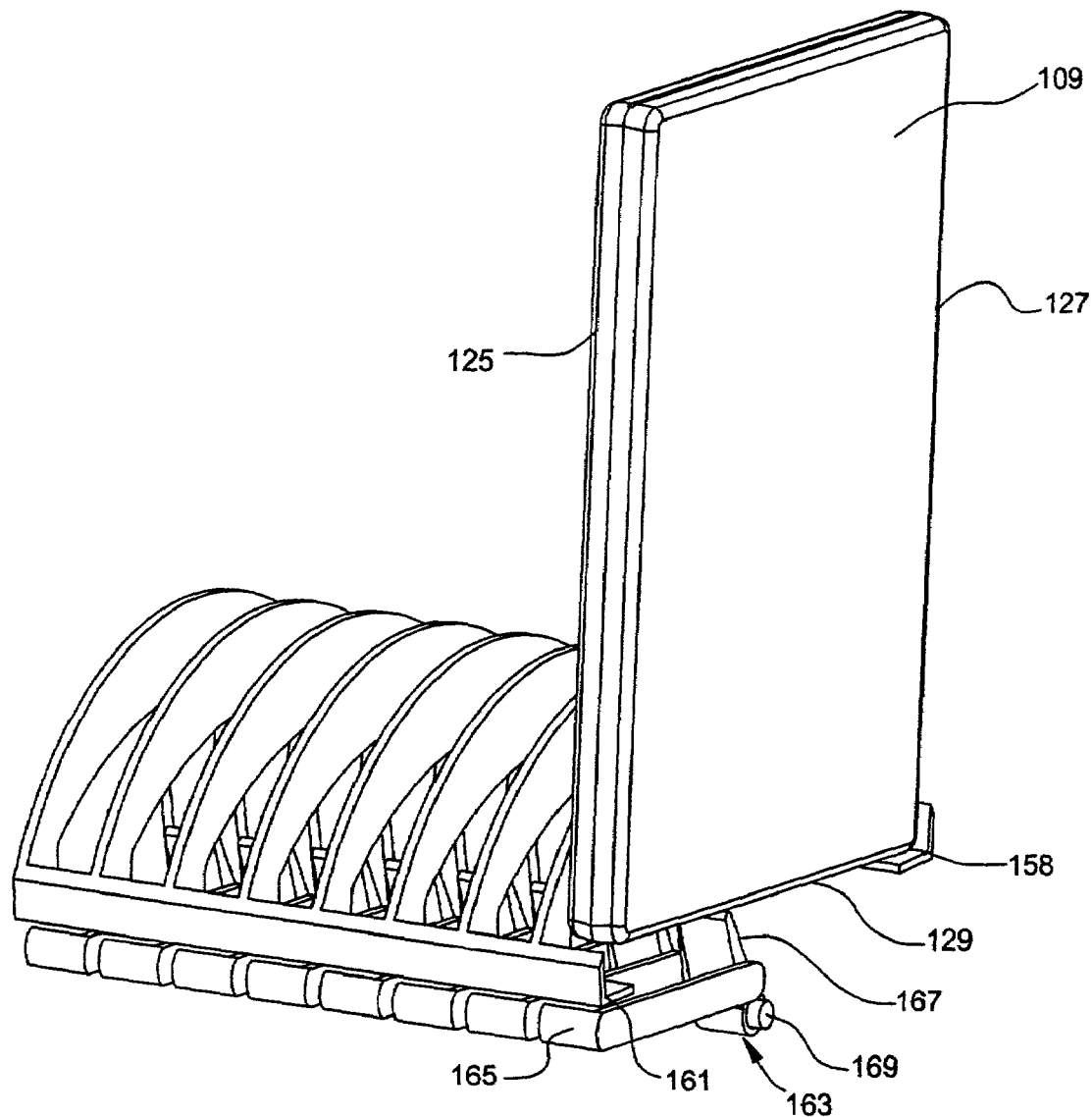
FIG. 26 is a pictorial diagram of a storage tray according to still another embodiment of the invention.
Figure 27:
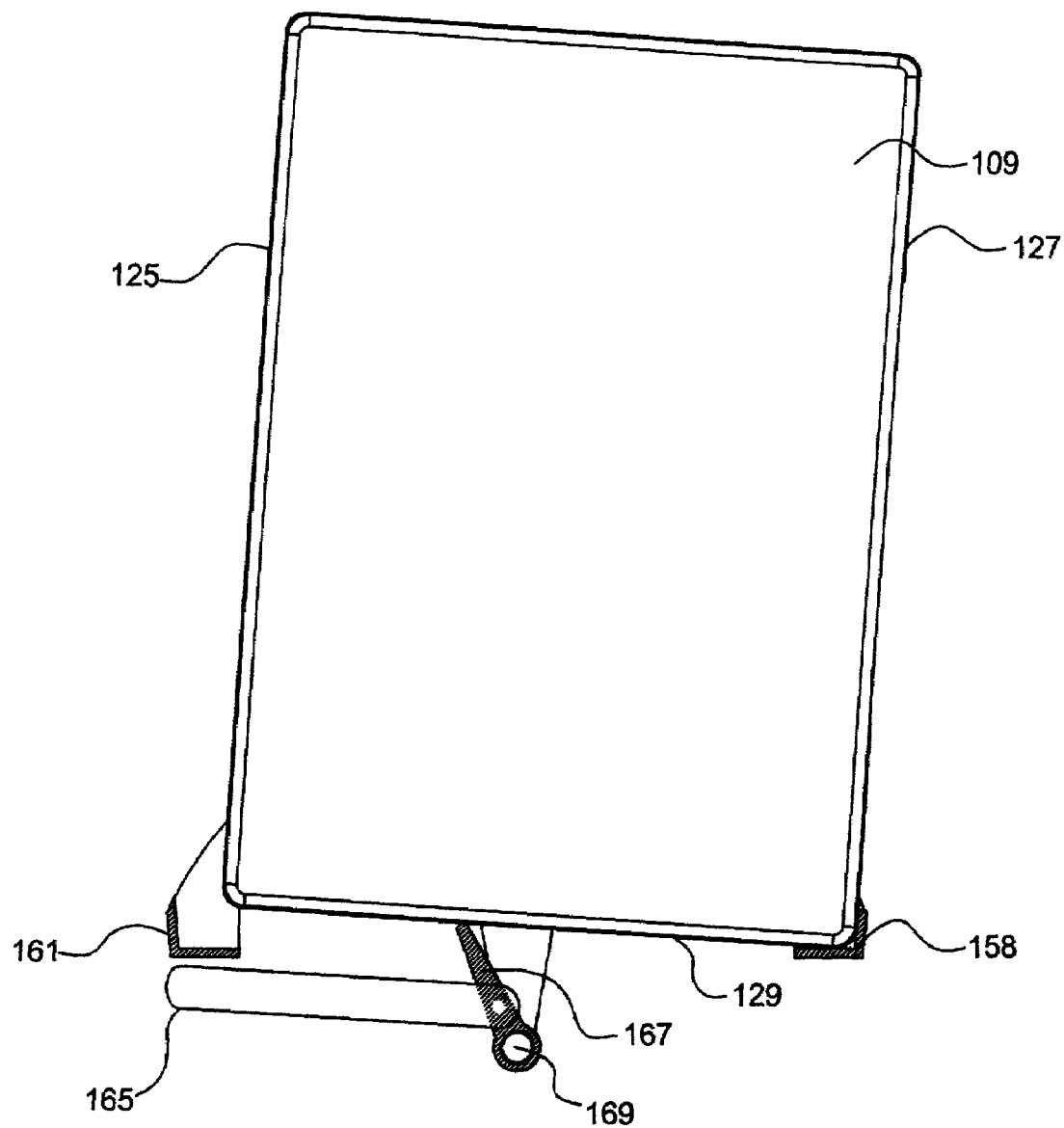
FIG. 27 is a cross-sectional side view of the storage tray of FIG. 26 with an item in a stored position.
Figure 28:
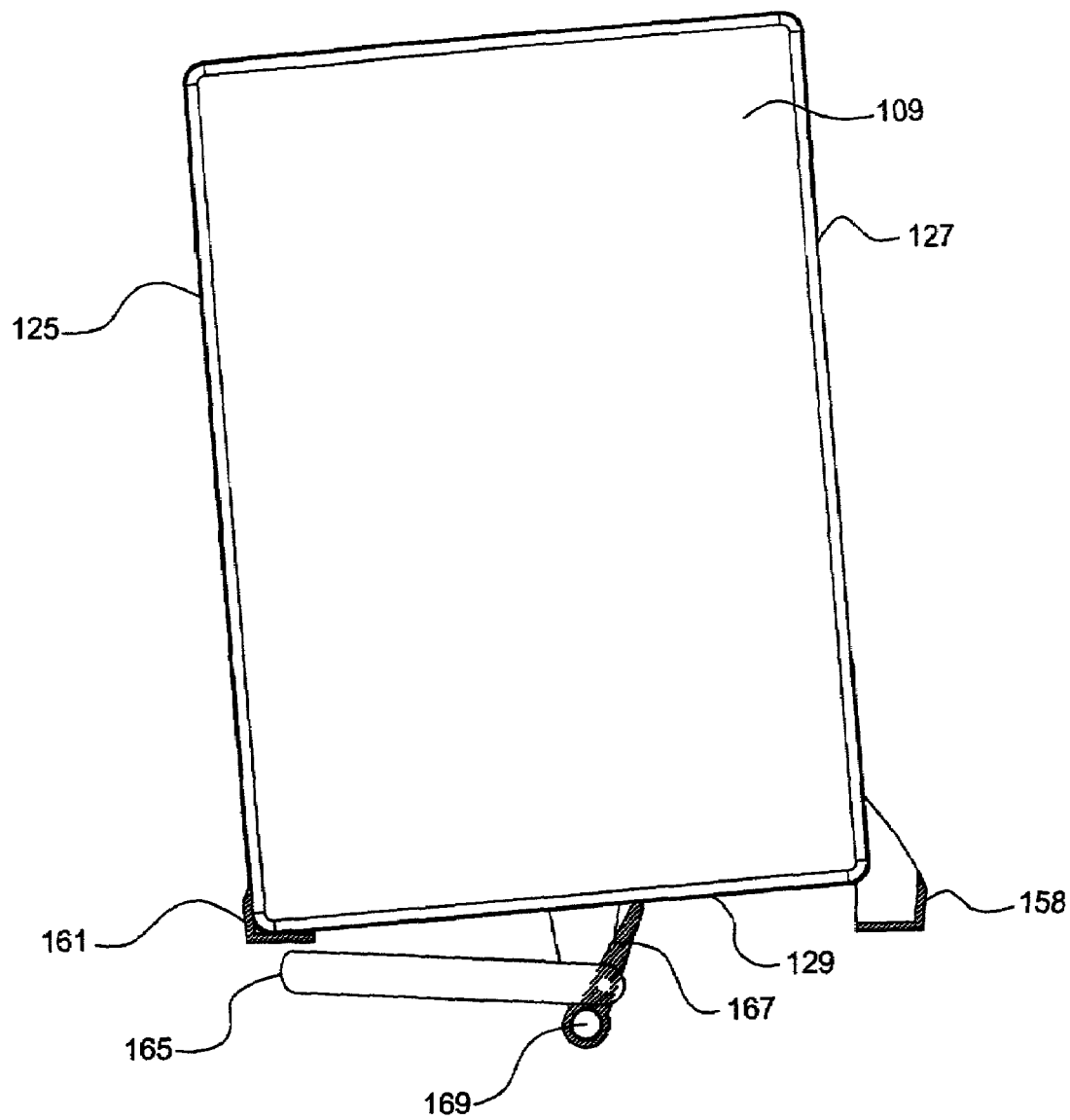
FIG. 28 is a cross-sectional side view of the storage tray of FIG. 26 with an item in an ejected position.

FIGS. 26 through 28 illustrate another embodiment of a storage tray according to the present invention. In this embodiment, an item such as DVD package 109 may be supported by a rear bottom support 158 or a front bottom support 161 in combination with a movable support 167 in between. A shifting mechanism 163 allows shifting of the DVD package 109 from a stored position to an ejected position. The shifting mechanism 163 comprises a push button actuator 165 adapted to shift the movable support 167 about a pivot 169. FIG. 27 illustrates the storage tray of FIG. 26 with the DVD package 109 in a stored position. In this position, the bottom perimeter edge 129 of the DVD package 109 rests on the rear bottom support 158 and the movable support 167. In this position, the tip of the movable support 167 is positioned forwardly of the center of gravity of the DVD package 109. Thus, the DVD package 109 rests stably on the rear bottom support 158 and the movable support 167. When a user applies a force to the push button actuator 165, the movable support 167 is rotated backwards to a second position. With the movable support in this position, the tip of the movable support 167 is located rearwardly of the center of gravity of the DVD package 109, causing the DVD package 109 to shift forward to its ejected position. Thus, in the ejected position, as illustrated in FIG. 28, the DVD package 109 rests stably on the front bottom support 161 and the movable support 167. In this position, the top portion of the front perimeter edge 125 of the DVD package 109 protrudes forward, allowing a user to grasp and remove it without disturbing adjacent items.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. An item storage device, comprising:
    a first support adapted to secure a first perimeter edge of an item in a stored position;
    a second support being disposed substantially above the first support and being adapted to secure a second perimeter edge of said item in the stored position; and
    a third support disposed substantially below the second support and adapted to latch a third perimeter edge of said item to secure said item in the stored position;
    wherein the first, second and third supports are placed within an operative relationship to each other and wherein only two of the supports support said item in an ejected position when said item is unlatched from the third support by raising said item out of engagement with the first and third supports and then releasing said item to permit it to rotate under force of gravity backwardly in the plane of the item about a horizontal axis to a stable ejected position in supporting engagement with at least said second support or said third support, where the first and third supports are disposed at different elevations relative to the second support to cause the item to be inclined in the ejected position.

2. The item storage device according to claim 1, further comprising a latching mechanism responsive to a user, said latching mechanism adapted to selectively unlatch said third support, thereby permitting said item to shift under force of gravity from said stored position to said ejected position.

3. The item storage device according to claim 2, wherein said latching mechanism comprises a push button adapted to actuate said third support.

4. The item storage device according to claim 2, wherein said latching mechanism comprises a resilient lever connected to said third support.

5. The item storage device according to claim 2, wherein said latching mechanism is adapted to force said item to an unlatched position.

6. The item storage device according to claim 2, wherein said latching mechanism is integral with said first support.

7. The item storage device according to claim 1, further comprising
    an upper arc having a plurality of flanges forming a plurality of upper slots; and
    a lower arc having a plurality of flanges forming a plurality of lower slots, each of said lower slots corresponding to one of said upper slots to form a pair of slots, each pair of slots adapted to accommodate a single item;
    wherein said third support is formed by a front edge of each of said upper slots;
    wherein said first support is formed by a front edge of each of said lower slots; and
    wherein said second support is formed by a back edge of at least one of said upper slots and said lower slots.

8. The item storage device according to claim 7, wherein each of said slots comprises an angled edge for laterally securing said item.

9. The item storage device according to claim 7, wherein said device is adapted to maintain a substantially flat unstressed configuration and is deformable under stress to an installed position.

10. The item storage device according to claim 1, wherein said device is made with a unibody construction.

11. The item storage device according to claim 1, wherein said device is in one piece, further comprising pegs integrally formed on the device for installing said device on a furniture unit.

12. An item storage device, comprising:
    bottom support means for securing a bottom perimeter edge of an item in a stored position;
    back support means being disposed substantially above the bottom support means for securing a back perimeter edge of said item in the stored position; and
    latching means disposed substantially below the back support means for latching a bottom portion of a front perimeter edge of said item to secure said item in a stored position;
    wherein the bottom support, the back support, and the latching means are placed within an operative relationship to each other and wherein only two of the bottom support, the back support, and the latching means support said item in an ejected position when said item is unlatched from the latching means by raising said item out of engagement with the bottom support means and the latching means and then releasing said item to permit it to rotate under the force of gravity backwardly in the plane of the item about a horizontal axis to a stable ejected position in supporting engagement with at least said back support means or said latching means, where the bottom support means and said latching means are disposed at different elevations relative to the back support means to cause the item to be inclined in the ejected position.

13. The item storage device according to claim 12, wherein said latching means is responsive to a user and is adapted to selectively unlatch said item, thereby causing said item to shift from said stored position to said ejected position.

14. The item storage device according to claim 13, wherein said latching means comprises a push button adapted to actuate said latching means.

15. The item storage device according to claim 13, wherein said latching means comprises a resilient lever connected to a latch portion.

16. The item storage device according to claim 13, wherein said latching means is adapted to force said item to an unlatched position.

17. The item storage device according to claim 13, wherein said latching means is integral with said bottom support means.

18. The item storage device according to claim 12, wherein said device is one piece, further comprising pegs integrally formed on the device for installing said device on a furniture unit.

19. The item storage device according to claim 12, further comprising an actuator adapted to actuate said latching means.

20. The item storage device according to claim 12, further comprising pegs for installing said device on a furniture unit.

21. An item storage device, comprising:
a first support adapted to support a front portion of a bottom perimeter edge of an item in a stored position;
a second support adapted to support a rear portion of a bottom perimeter edge of said item in said stored position; and
a back stop support being disposed substantially above the first and second supports and adapted to contact a back perimeter edge of said item when said item is forced backwardly;
wherein said first support is further adapted to support a front perimeter edge of said item in an ejected position; and
wherein the first, second and back stop supports are placed within an operative relationship to each other and wherein only two of the supports support said item in an ejected position when said item is unlatched from the first support by raising said item out of engagement with the second and back stop supports and then releasing said item to permit it to rotate under force of gravity backwardly in the plane of the item about a horizontal axis to a stable elected position in supporting engagement with at least said second support or said first support, where the first and second supports are disposed at different elevations relative to the back stop support to cause the item to be inclined in the ejected position.

22. The item storage device according to claim 21, further comprising
a plurality of partitions forming a plurality of upper slots therebetween, each of said slots adapted to accommodate a single item.

23. The item storage device according to claim 22, each of said plurality of slots is adapted to accommodate any of a variety of items.

24. The item storage device according to claim 21, wherein said device is adapted to maintain a substantially flat unstressed configuration and is deformable under stress to an installed position.

25. The item storage device according to claim 21, further comprising pegs for installing said device on a furniture unit.

26. A item storage device, comprising:
a fixed rear support adapted to support a rear portion of an item in a stored position; and
a fixed front support adapted to support a front portion of said item in an ejected position; and
a movable support adapted to support a central portion of a bottom perimeter edge of said item, said movable support being adapted to be moved between a first position for supporting said item in said stored position and a second position for supporting said item in said ejected position,
wherein the fixed rear, fixed front, and movable supports are placed within an operative relationship to each other and wherein only two of the supports support said item in an elected position when said item is unlatched from the movable support by raising said item out of engagement with the fixed front and movable supports and then releasing said item to permit it to rotate under force of gravity backwardly in the plane of the item about a horizontal axis to a stable elected position in supporting engagement with at least said fixed rear support or said fixed front support, where the fixed front and movable supports are disposed at different elevations relative to the fixed rear support to cause the item to be inclined in the ejected position.

27. The item storage device according to claim 26, wherein said first position is forward of a center of gravity of said item, and wherein said ejected position is rearward of said center of gravity.

28. The item storage device according to claim 26, further comprising an actuator for moving said movable support between said ejected position and said stored position.

29. The item storage device according to claim 28, wherein said movable support is adapted to rotate about a pivot in response to said actuator.

30. The item storage device according to claim 28, further comprising pegs for installing said device on a furniture unit.

31. A method of using an item storage device, comprising:
arranging at least one item in the storage device in a stored position in engagement with a first support;
securing the item in the stored position with a latch support; and
unlatching the item to cause it to rotate under force of gravity to a stable ejected position in engagement with a second supports,
wherein the first, second and latch supports are placed within an operative relationship to each other and wherein only two of the supports support said item in an ejected position when said item is unlatched from the latch support by raising said item out of engagement with the first and latch supports and then releasing said item to permit it to rotate under force of gravity backwardly in the plane of the item about a horizontal axis to a stable ejected position in supporting engagement with at least said second support or said first support, where the first and latch supports are disposed at different elevations relative to the second support to cause the item to be inclined in the ejected position.

32. A method of using an item storage device, comprising:
arranging at least one item in the storage device in engagement with a first support at a first position on the item and with a second support at a second position on the item substantially above the first position;
securing the item in a stored position with a latch support engaging the item at a third position substantially below the second position; and
unlatching the item from the latch support by raising said item out of engagement with the first support and the latch support and then releasing the item for allowing the item to rotate into an ejected position supported by only two of the supports with a portion of the item extending from the storage device, wherein the first support and the latch support are disposed at different elevations relative to the second support to cause the item to be inclined in the ejected position.

33. A method as described in claim 32 wherein the item is unlatched by placing a finger on the item and moving the finger across the item.

* * * * *

UNITED STATES PATENT AND TRADEMARK OFFICE
CERTIFICATE OF CORRECTION

PATENT NO. : 6,988,627 B2 Page 1 of 1
APPLICATION NO. : 10/121979
DATED : January 24, 2006
INVENTOR(S) : Thomas Hunt It is certified that error appears in the above-identified patent and that said Letters Patent is hereby corrected as shown below:

Claim 27, column 10, line 22, delete "first" and insert -- ejected --

Claim 27, column 10, line 23, delete "ejected" and insert -- stored --

Claim 31, column 10, line 41, delete "supports" and insert -- support --.

Signed and Sealed this

Nineteenth Day of September, 2006

JON W. DUDAS
*Director of the United States Patent and Trademark Office*